US011475573B2

(12) United States Patent
Pfeiffer

(10) Patent No.: US 11,475,573 B2
(45) Date of Patent: *Oct. 18, 2022

(54) SENSOR DATA SEGMENTATION

(71) Applicant: Zoox, Inc., Foster City, CA (US)

(72) Inventor: David Pfeiffer, Foster City, CA (US)

(73) Assignee: Zoox, Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/093,086

(22) Filed: Nov. 9, 2020

(65) Prior Publication Data
US 2021/0056705 A1 Feb. 25, 2021

Related U.S. Application Data

(63) Continuation of application No. 16/716,960, filed on Dec. 17, 2019, now Pat. No. 10,832,414, which is a
(Continued)

(51) Int. Cl.
G06T 7/11 (2017.01)
G06K 9/00 (2022.01)
(Continued)

(52) U.S. Cl.
CPC .............. G06T 7/11 (2017.01); G05D 1/0253 (2013.01); G06N 20/00 (2019.01); G06V 20/56 (2022.01);
(Continued)

(58) Field of Classification Search
CPC ............. G06T 7/11; G06T 2207/20081; G06T 2207/20084; G06T 2207/30252;
(Continued)

(56) References Cited

U.S. PATENT DOCUMENTS 6,102,864 A 8/2000 Hatfield et al.
8,379,020 B2 2/2013 Clifton
(Continued)

FOREIGN PATENT DOCUMENTS

EP 3078935 A1 10/2016
JP 2003168197 A 6/2003
(Continued)

OTHER PUBLICATIONS

Invitation to Pay Additional Fees dated Aug. 6, 2021 for European Patent Application No. 18815392.8, 4 pages.
(Continued)

Primary Examiner — Gregory M Desire
(74) Attorney, Agent, or Firm — Lee & Hayes, P.C.

(57) ABSTRACT

A system may include one or more processors configured to receive a plurality of images representing an environment. The images may include image data generated by an image capture device. The processors may also be configured to transmit the image data to an image segmentation network configured to segment the images. The processors may also be configured to receive sensor data associated with the environment including sensor data generated by a sensor of a type different than an image capture device. The processors may be configured to associate the sensor data with segmented images to create a training dataset. The processors may be configured to transmit the training dataset to a machine learning network configured to run a sensor data segmentation model, and train the sensor data segmentation model using the training dataset, such that the sensor data segmentation model is configured to segment sensor data.

20 Claims, 11 Drawing Sheets

Related U.S. Application Data continuation of application No. 15/820,245, filed on Nov. 21, 2017, now Pat. No. 10,535,138.

(51) Int. Cl.
| | |
|---|---|
| G05D 1/02 | (2020.01) |
| G06N 20/00 | (2019.01) |
| G06V 20/56 | (2022.01) |
| G01S 17/02 | (2020.01) |
| G05D 1/00 | (2006.01) |
| G01S 17/931 | (2020.01) |

(52) U.S. Cl.
CPC ............ *G01S 17/02* (2013.01); *G01S 17/931* (2020.01); *G05D 1/0088* (2013.01); *G05D 1/0221* (2013.01); *G06T 2207/20081* (2013.01); *G06T 2207/20084* (2013.01); *G06T 2207/30252* (2013.01)

(58) Field of Classification Search
CPC ...... G06N 20/00; G06V 20/56; G05D 1/0253; G05D 1/0088; G05D 1/0221; G01S 17/931; G01S 17/02
See application file for complete search history.

(56) References Cited

U.S. PATENT DOCUMENTS

| | | | |
|---|---|---|---|
| 8,655,079 B2 | 2/2014 | Saisan | |
| 8,811,748 B2 | 8/2014 | Morris | |
| 8,913,784 B2 | 12/2014 | Collard et al. | |
| 9,110,163 B2 | 8/2015 | Rogan | |
| 9,523,772 B2 | 12/2016 | Rogan et al. | |
| 9,633,483 B1 | 4/2017 | Xu et al. | |
| 9,710,714 B2 | 7/2017 | Chen et al. | |
| 10,147,193 B2* | 12/2018 | Huang | G06T 7/10 |
| 10,209,718 B2 | 2/2019 | Tiwari et al. | |
| 10,474,160 B2* | 11/2019 | Huang et al. | G06V 10/7515 382/181 |
| 10,514,462 B2 | 12/2019 | Englard et al. | |
| 10,592,805 B2* | 3/2020 | Groh | G06F 30/20 |
| 11,104,334 B2* | 8/2021 | Yan et al. | G06V 10/22 382/229 |
| 11,131,753 B2* | 9/2021 | Banerjee et al. | G06V 10/768 382/229 |
| 2006/0151223 A1 | 7/2006 | Knoll | |
| 2009/0292468 A1 | 11/2009 | Wu et al. | |
| 2011/0202538 A1 | 8/2011 | Saleman | |
| 2014/0309841 A1 | 10/2014 | Hara et al. | |
| 2014/0368807 A1 | 12/2014 | Rogan | |
| 2016/0117587 A1 | 4/2016 | Yan | |
| 2017/0193312 A1 | 7/2017 | Ai et al. | |
| 2017/0220876 A1 | 8/2017 | Gao et al. | |
| 2017/0248963 A1 | 8/2017 | Levinson et al. | |
| 2017/0359561 A1 | 12/2017 | Vallespi-Gonzalez | |
| 2018/0012370 A1 | 1/2018 | Aghamohammadi et al. | |
| 2018/0136332 A1 | 5/2018 | Barfield, Jr. et al. | |
| 2018/0188059 A1 | 7/2018 | Wheeler et al. | |
| 2018/0232947 A1 | 8/2018 | Nehmadi et al. | |
| 2018/0364717 A1 | 12/2018 | Douillard et al. | |
| 2019/0114481 A1 | 4/2019 | DeChant et al. | |
| 2019/0147331 A1* | 5/2019 | Arditi | G06V 20/58 706/20 |
| 2019/0156485 A1 | 5/2019 | Pfeiffer | |
| 2019/0178988 A1 | 5/2019 | Englard et al. | |
| 2019/0258737 A1 | 8/2019 | Wang et al. | |
| 2020/0126237 A1 | 4/2020 | Pfeiffer | |

FOREIGN PATENT DOCUMENTS

| | | | |
|---|---|---|---|
| JP | 2015133078 A | 7/2015 | |
| JP | 2015537268 A | 12/2015 | |
| JP | WO2014003182 A1 | 6/2016 | |
| JP | 2017102838 A | 6/2017 | |
| JP | 2017134814 A | 8/2017 | |
| WO | WO2017079522 A1 | 5/2017 | |
| WO | WO2017183034 A1 | 10/2017 | |

OTHER PUBLICATIONS

Asvadi et al., "Two-Stage Static Dynamic Environment Modeling using Voxel Representation", Robot 2015, Second Iberian Robotics Conf, Nov. 2015, 12 pgs.

Azim, et al., "Detection, Classification and Tracking of Moving Objects in a 3D Environment", 2012 Intelligent Vehicles Symposium, Jun. 2012, 3 pages.

Byun, et al., "Toward Accurate Road Detection in Challenging Environments Using 30 Point Clouds", ETRI Journal, vol. 37, No. 3, Jun. 2015, 6 pages.

The PCT Invitation to Pay Additional Fees, dated Feb. 15, 2019, for PCT Application No. PCT/US18/59304, 12 pages.

Lehtomaki, et. al., "Object Classification and Recognition From Mobile Laser Scanning Point Clouds in a Road Environment", IEEE Transactions on Geoscience and Remote Sensing, vol. 54, No. 2, Feb. 2016, 7 pages.

Morton et al., "An Evaluation of Dynamic Object Tracking with 3D LIDAR", Proceedings Australasian Conf on Robotics and Automation, Dec. 2011, 20 pgs.

Na, et al., "The Ground Segmentation of 30 LIDAR Point Cloud with the Optilnized Region Merging", 2013 International Conference on Connected Vehicles and Expo (ICCVE), IEEE, Dec. 2, 2013, 6 pgs.

Non Final Office Action dated Mar. 18, 2020 for U.S. Appl. No. 16/716,960 "Sensor Data Segmentation" Pfeiffer, 8 pages.

Office Action for U.S. Appl. No. 15/622,905, dated Mar. 7, 2019, Douillard et al., "Voxel Based Ground Plane Estimation and Object Segmentation", 7 pages.

Non Final Office Action dated Apr. 16, 2020 for U.S. Appl. No. 15/900,319 "Creating Clean Maps Including Semantic Information" Wang, 26 pages.

Office Action for U.S. Appl. No. 15/820,245, dated May 16, 2019, Pfeiffer," Sensor Data Segmentation", 7 pages.

The PCT Search Report and Written Opinion dated Apr. 11, 2019, for PCT Application No. PCT/US2018/059304, 18 pages.

The PCT Search Report and Written Opinion dated Apr. 2, 2019 for PCT Application No. PCT/US2019/016968, 14 pages.

The PCT Search Report and Written Opinion dated Aug. 31, 2018, for PCT Application No. PCT/US18/36410, 14 pages.

Piewak, et al., "Boosting LiDAR-Based Semantic Labeling by Cross-modal Training Data Generation", Published Apr. 26, 2018, by Springer, International Publishing, in Serious Games, part VI, Sections 3.3 and 3.4, 16 pages.

Varga, et al., "Super-sensor for 360-degree environment perception: Point cloud segmentation using image features", 2017 IEEE 20th International Conference on Intelligent Transportation Systems (ITSC), IEEE, Oct. 16, 2017, sections III.A, III.B, IV.C, IV.D, pp. 1-8.

Xiao, et al., "CRF based Road Detection with Multi-Sensor Fusion", 2015 IEEE Intelligent Vehicles Symposium (IV), IEEE, Jun. 28, 2015 (Jun. 28, 2015), pp. 192-198.

Final Office Action dated Nov. 20, 2020 for U.S. Appl. No. 15/900,319, "Creating Clean Maps Including Semantic Information", Wang, 30 pages.

European Office Action dated Mar. 10, 2022 for European Patent Application No. 19707192.1, a foreign counterpart to U.S. Pat. No. 11,157,527, 9 pages.

Japanese Office Action dated Jul. 26, 2022 for Japanese Patent Application No. 2020-528012, a foreign counterpart to U.S. Pat. No. 10,535,138, 16 pages.

"Loss Functions in Deep Learning", retrieved from https://yeephyco.github.io/2017/09/16Loss-Functions-In-Deep-Learning>>, Sep. 16, 2017, 7 pages.

* cited by examiner

SENSOR DATA SEGMENTATION

CROSS-REFERENCE TO RELATED APPLICATION

This application is a continuation and claims priority to commonly assigned, co-pending, U.S. patent application Ser. No. 16/716,960, filed Dec. 17, 2019, which is a continuation of U.S. patent application Ser. No. 15/820,245, filed Nov. 21, 2017, Now U.S. Pat. No. 10,535,138 and issued Jan. 14, 2020. Application Ser. No. 16/716,960 and 15/820,245 and U.S. Pat. No. 10,535,138 are fully incorporated herein by reference.

BACKGROUND

Sensors may be used to generate sensor data indicative of objects in an environment. However, the raw form of the sensor data generated by the sensor may render it difficult to use or analyze the data. Thus, the sensor data may be segmented to transform it into a more useful form (e.g., identifying distinct objects in the data, areas in sensor data that are drivable (i.e., can be driven on), etc.). Segmenting the data generally involves partitioning or organizing the sensor data into a more meaningful or organized form so that, for example, areas of captured data in the sensor data may be identified or categorized. Data segmentation may be performed manually by a human. However, manual segmentation may be prohibitively time consuming and costly, often rendering it unsuitable for many applications. Image data may be automatically segmented using a computer, which partitions the image into different segments to provide a more meaningful or usable representation of the images. For example, an image may be segmented to uniquely identify objects within the image, which may be useful in some applications, such as, for example, operation of an autonomous vehicle. However, it may be difficult to automatically segment sensor data obtained from other types of sensors. In such instances, manual segmentation by humans may be necessary, rendering sensor data obtained from such sensor types prohibitively costly or difficult to use for some applications.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
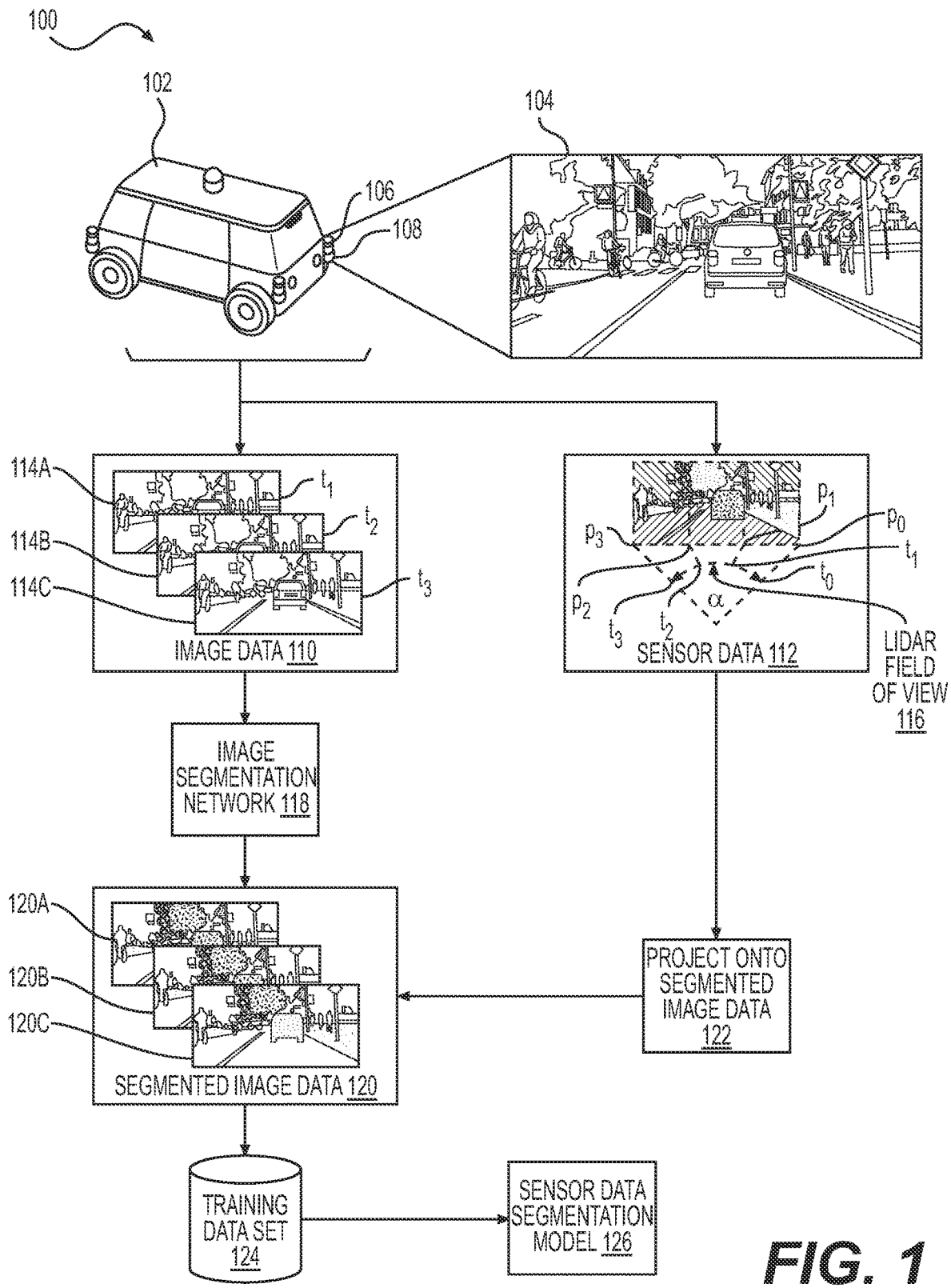
FIG. 1 is a pictorial flow diagram of an example process for capturing image data and sensor data, segmenting the captured images, projecting the sensor data onto the segmented images, and generating a training dataset.

This disclosure is generally directed to methods, apparatuses, and systems for segmenting sensor data. Such segmentation of sensor data may be aided by segmentation of other types of sensor data that is more easily segmented. For example, a system may concurrently, or substantially simultaneously, capture image data using one or more image captures devices and sensor data using one or more sensors of a type different than an image capture device. Because segmentation of image data may yield more accurate results than segmentation of sensor data (other than image data), the image data may be used to aid or train segmentation of the sensor data. The system may segment the images and associate the sensor data with the segmented images to create a training dataset that may be used to train a sensor data segmentation model. For example, sensor data (e.g., sensor data captured by a LIDAR sensor, as discussed herein) can be projected onto the segmented images, and segmentation information associated with the segmented images may be translated or applied to the sensor data to create the training dataset. The trained sensor data segmentation model may be used to automatically segment sensor data obtained from the other type of sensor, thereby rendering the sensor data more useful for many applications, such as, for example, operation of an autonomous vehicle. Other applications are contemplated. Similarly, in some examples, any one type of sensor data may be used to aid and or train segmentation of another type of sensor data.

This disclosure is generally directed to a system configured to receive a plurality of images representing an environment. The images may include image data generated by an image capture device. The system may be configured to transmit the image data to an image segmentation network configured to segment the images and generate segmented images. The system may also receive sensor data associated with the environment. The sensor data may include sensor data generated by a sensor type other than an image capture device. For example, the image capture device and the sensor may concurrently, or substantially simultaneously (within technical capabilities), capture data associated with the environment. The image capture device may include, for example, one or more cameras (e.g., RGB-cameras, monochrome cameras, intensity (grey scale) cameras, infrared cameras, ultraviolet cameras, depth cameras, stereo cameras, and the like). The sensor may include, for example, one or more light detection and ranging (LIDAR) sensors, one or more radio detection and ranging (RADAR) sensors, one or more sound navigation and ranging (SONAR) sensors, and other sensors. The system may also be configured to associate the sensor data with the segmented images to create a training dataset. The training dataset may be transmitted to a machine learning network configured as a sensor data segmentation model. The system may also be configured to train the sensor data segmentation model using the training dataset, such that the sensor data segmentation model is configured to segment sensor data obtained from the sensor type.

In some examples, the system may be configured to project the sensor data onto the segmented images to associate the sensor data with classes (or classifications) of the segmented images. Each of the images captured by the image capture device may be captured at respective image times, and the various portions of the sensor data may be captured at various sensor times. In some examples, the system may be configured to select images captured at image times minimizing a difference between the image time and a sensor time associated with a portion of the sensor data, and associate the portion of the sensor data with the selected images or portion of the images. In this example manner, the difference in timing of the image data capture and the sensor data capture may be minimized, thereby reducing the likelihood of potential errors in the segmented sensor data. In some examples, more than one image capture device may capture the image data, and the image data may be aligned and fused before the sensor data is associated with the segmented images.

In some examples, the system may be configured to align the sensor data with the segmented images. The image data may be captured from a different angle and/or may be associated with a different view of the environment than the view of the other sensor. For example, the image data may encompass a view having a different width, height, and/or aspect ratio than the view encompassed by the sensor data. In some examples, the system may be configured to temporally and/or spatially align the segmented images with the sensor data. In addition, the field of view of the image capture device and the field of view of the other sensor may at least partially overlap, so that the image data and the sensor data include data associated with portions of the environment common to both the field of view of the image capture device and the field of view of the other sensor.

In some examples, the system may be configured to identify image data associated with partial representations of objects in the images and ignore or otherwise mask segmented image data associated with the partial representations when associating the sensor data with the segmented images to create the training dataset. Partial representations may be a source for errors in the training data, and thus, some examples of the system may be configured to ignore such data to reduce the likelihood that errors are created in the training dataset. In some examples, the system may be configured to delete sensor data associated with discontinuities in the sensor data. For example, discontinuities in the sensor data may be an indication of that the sensor has detected more than a single object, such as, for example, a person and an object behind the person, such as a wall. Deleting, masking, or ignoring data associated with discontinuities may reduce the likelihood that errors are created in the training dataset. Other techniques for reducing the likelihood of errors are contemplated. For example, identifying discontinuities may include determining that LIDAR data points associated with a single object represent an unusually wide range of distance. For example, a person might be standing ten feet in front of a solid wall. When segmenting the associated image, the background might be captured in the "pedestrian object." However, when projecting LIDAR data into the "pedestrian object," some of the LIDAR data will be ten feet further from the sensor than the data actually associated with the person. In such instances, if the distance is above a threshold, this would indicate a discontinuity, and the data, in some examples, may be masked, ignored, or deleted to avoid the creating of inaccuracies in the training data and in the machine learning network.

In some examples, rather than using segmented images to generate training datasets for training the machine learning network, previously acquired and segmented data from the sensor may be used to generate training datasets for training the sensor data segmentation model.

This disclosure is also generally directed to a system configured to segment sensor data generated by sensors other than image capture devices. For example, the system may be configured to receive data from such a sensor, for example, one or more LIDAR sensors, one or more RADAR sensors, one or more SONAR sensors, and other sensors. For example, the system may be configured to segment the sensor data received from a LIDAR sensor using the sensor data segmentation model and generate segmented LIDAR data. For example, the system may use a machine learning model (e.g., a neural network) configured to run the sensor data segmentation model to generate segmented sensor data (e.g., for a neural network, to use the trained network in inference mode to segment the sensor data). In this example manner, the system may automatically segment the sensor data. By segmenting the sensor data, the segmented sensor data may have a form that is more useful. For example, the segmented sensor data may be used by a perception system of an autonomous vehicle, which may inform one or more systems which generate trajectories for operation of the autonomous vehicle based at least in part on the segmented sensor data. Other uses of the segmented sensor data are contemplated.

This disclosure is also generally directed to a method for segmenting sensor data. The method may include receiving one or more images representing an environment. The images may include image data generated by one or more image capture devices. The method may also include transmitting the image data to an image segmentation network configured to segment the images. The method may also include receiving sensor data generated by a sensor other than an image capture device. The sensor data may include data representative of the environment. The method may also include segmenting the images to generate segmented images, and associating the sensor data with the segmented images to create a training dataset. The method may further include transmitting the training dataset to a machine learning network configured to run a sensor data segmentation model (i.e., to use the segmentation model to segment the sensor data), and training the sensor data segmentation model using the training dataset, such that the sensor data segmentation model is configured to segment sensor data obtained from the sensor.

This disclosure is also generally directed to a method for generating trajectories for an autonomous vehicle. The method may include receiving sensor data from a sensor other than an image capture device, and segmenting the sensor data received from the sensor using a sensor data segmentation model. The method may also include generating one or more trajectories for an autonomous vehicle based at least in part on the segmented sensor data.

The generation of training data and the training of machine learning models described herein can improve a functioning of a computing device by generating training data in a more accurate and reliable manner that improves performance of segmentation and/or classification of objects represented in the sensor data. In some instances, the improved training data generation and related systems may provide more accurate and/or faster segmentation by training machine learning networks and/or algorithms for improved automatic segmentation and/or classification of the sensor data. Using the training data generation and training operations described herein to automatically determine segmentation information based on image segmentation leads to more accurate and/or faster classification of objects by exposing additional data to a machine learning algorithm. Further, the training data and training techniques described herein may allow for deep learning techniques, which provide improved processing. In some instances, faster and/or more accurate segmentation and/or classification may be utilized in generating a trajectory of an autonomous vehicle, which may improve safety for occupants of an autonomous vehicle. In some instances, the training data generation and training operations described herein may reduce memory requirements or reduce an amount of processing by applying machine learning operations (e.g., an artificial neural network) to simplified (e.g., segmented) data. In further examples, such a method may be easily expanded to incorporate multiple sensor types and subtypes, which might otherwise require creating multiple training sets. These and other improvements to the functioning of the computer are discussed herein.

The techniques and systems described herein may be implemented in a number of ways. Example implementations are provided below with reference to the figures.

FIG. 1 is a pictorial flow diagram 100 of an example process for capturing images and sensor data, segmenting the captured images, projecting the sensor data onto the segmented images, and generating a training dataset for training a sensor data segmentation model. In the example shown, an example vehicle 102 travels through the environment 104. For example, the vehicle 102 may be an autonomous vehicle, such as the example vehicle described herein with respect to FIG. 2. The vehicle 102 may include one or more image capture devices 106 and one or more sensors 108 (e.g., one or more LIDAR sensors, radar sensors, ultrasonic transducers, or the like) configured to respectively capture image data 110 and sensor data 112 associated with the environment 104 in which the one or more image capture devices 106 and one or more sensors 108 are present. Although FIG. 1 identifies a single image capture device 106 and a single sensor 108, more image capture devices 106 and/or more sensors 108 are contemplated, for example, as described herein with respect to FIGS. 4A and 4B. The image capture devices 106 may be any type of image capture device configured to capture images representative of the environment, such as, for example, one or more cameras (e.g., RGB-cameras, monochrome cameras, intensity (grey scale) cameras, infrared cameras, ultraviolet cameras, depth cameras, stereo cameras, and the like). The sensors 108 may be any type of sensor configured to generate data representative of the environment other than an image capture device. For example, the sensor 108 may be one or more LIDAR sensors, one or more RADAR sensors, one or more SONAR sensors, and other sensors.

In the example shown in FIG. 1, the image capture device 106 is depicted as capturing image data 110 in the form of images 114A-114C corresponding to three respective fields of view at three consecutive times $t_1$, $t_2$, and $t_3$. For example, as schematically shown, the image capture device 106 captures image 114A associated with the field of view at time $t_1$, image 114B associated with the field of view at time $t_2$, and image 114C associated with the field of view at $t_3$. Each of the images 114A-114C may have a slightly different field of view as the image capture device 106 travels through the environment 104. In such examples, each image 114A-114C has respective perspectives that are different and which encompass different portions of the environment 104. In some examples, the image data 110 captured by each of the images 114A-114C may be fused to generate a more complete or accurate representation of the environment 104.

For the purpose of illustration, the example sensor 108 shown in FIG. 1 is a LIDAR sensor configured to capture sensor data 112 in the form of LIDAR sensor data. Other types of sensors are contemplated. A LIDAR sensor may have a light emitter and a light sensor, with the light emitter including one or more lasers that direct highly focused light toward an object or surface, which reflects the light back to the light sensor. Measurements of the LIDAR sensor may be represented as three-dimensional LIDAR data having coordinates (e.g., Cartesian, polar, etc.) corresponding to positions or distances captured by the LIDAR sensor. In some examples, converting operations may be used to convert the three-dimensional LIDAR data to multi-channel two-dimensional data, wherein the azimuth and elevation are mapped to an X-Y coordinate, one channel including a range and the other channel including an intensity. In some examples, the LIDAR data may be automatically segmented as described herein, and the segmented LIDAR data may be used, for example, as input for determining trajectories for autonomous vehicles.

In some examples, the LIDAR sensor may be configured such that the one or more lasers are mounted to spin (e.g., about a substantially vertical axis), thereby causing the lasers to sweep through, for example, 360 degrees, to capture LIDAR data associated with the environment. For example, as shown in FIG. 1, the one or more lasers may sweep through an angle $\alpha$, such that at time $t_0$, the one or more lasers are aimed at the environment 104 along a vertical position $p_0$. Similarly, at time $t_1$, the one or more lasers are aimed at the environment along a vertical position $p_1$, at time $t_2$, the one or more lasers are aimed at the environment along a vertical position $p_2$, and at time $t_3$, the one or more lasers are aimed at the environment along a vertical position $p_3$.

In some examples, the example sensor 108 is configured to capture a field of view 116, which may be different than the fields of view associated with each of the respective images 114A-114C captured by the image capture device 106. Though depicted in FIG. 1 for illustrative purposes, such a field of view may be, for example, up to and including 360 degrees. In the example shown, the example field of view 116 of the sensor 108 also has an aspect ratio different than the fields of view associated with the respective images 114A-114C captured by the image capture device 106. For example, the field of view 116 of the LIDAR sensor may be wider and narrower (e.g., shorter in height) than the respective fields of view associated with the images 114A-114C. It is contemplated that in some examples the field of view 116 may be the same as one or more of the fields of view associated with the images captured by the image capture device 106. In examples where the field of view 116 of the sensor 104 is different than one or more of the fields of view associated with the images captured by the image capture device 106, as explained in more detail herein, the system described herein may be configured to account for such differences to align the images with the sensor data 112. In addition, the sensor 104 (e.g., a LIDAR sensor) may be configured to generate sensor data in a number of channels and/or according to a beam spread, and the system may be configured to account for such differences between the image data 110 and the sensor data 112, and align the images with the sensor data 112.

As shown in FIG. 1, the example process 100 may include transmitting the image data 110 including the images 114A-114C to an image segmentation network 118 configured to automatically segment the images 114A-114C to generate segmented images 120A-120C, for example, via algorithms and/or machine learning, which may predict a segmented image from an input image. Machine learning generally refers to a broad class of such algorithms in which an output is generated based on learned parameters, which will be discussed in detail below. In some embodiments, an example machine learning algorithm that may be used to generate the segmented images 120A-120C is an artificial neural network (ANN). ANNs are biologically inspired algorithms, which pass input data through a series of connected layers to produce an output. Each layer in a ANN may include any number of layers, and may also include another ANN. The manner in which the various layers of an ANN are connected to one another is generally referred to as an architecture of the ANN. Other types of image segmentation networks for segmenting images are contemplated.

Image segmentation may be used to partition an image into different segments, or super-pixels, to provide a more meaningful representation of the image. For example, an image may be segmented so as to uniquely identify objects within the image, each object having a unique identifier. Image segmentation may be used in a number of different applications. For example, a segmented image associated with a scene in an environment may contain a representation of one or more objects located in the environment. The presence and/or locations of the objects contained in the segmented image may, in turn, be used for obstacle avoidance, object detection and tracking, or the like, for example, in systems using some aspects of machine vision. For example, as explained herein, segmented images and/or segmented sensor data may be used by a perception system of an autonomous vehicle to generate vehicle trajectories for operating the autonomous vehicle through the environment. In some examples, an image may be segmented to provide drivable surfaces. In such examples, pixels may be broadly classified as belonging to a drivable surface or not. Such segmented images may be used to inform an autonomous vehicle of which trajectories are feasible.

As shown in FIG. 1, the sensor 108 may generate sensor data 112 representative of the environment 104 in which the sensor 108 is present. At 122, the sensor data 112 may be projected (e.g., via a transformation and un-projection) onto the segmented images 120A-120C. As explained herein, the sensor data 112 may be projected onto the segmented images 120A-120C, such that the sensor data 112 and the segmented images 120A-120C are substantially temporally aligned (within technical capabilities). In addition, as explained herein, the sensor data 112 may be projected onto the segmented images 120A-120C, so that sensor data 112 associated with objects in the environment 104 is spatially aligned with the objects in the segmented images 120A-120C (within technical capabilities).

For example, the sensor 108 may be a LIDAR sensor, for example, as described above, which includes one or more lasers that spin about an axis (e.g., a substantially vertical axis) and capture LIDAR sensor data as the one or more lasers rotate. As the lasers rotate, at times $t_0$, $t_1$, $t_2$, and $t_3$, they capture sensor data 112 corresponding to vertical lines $p_0$, $p_1$, $p_2$, and $p_3$. In some examples, the LIDAR sensor may provide LIDAR sensor data at a frequency over which the LIDAR data may be mapped to a single image or group of images (within technical tolerance). In some examples, the image capture device 106 may be configured to capture images at a faster rate than the lasers complete a sweep on the environment. Thus, in some examples, the sensor data 112 may be temporally aligned with the image data 110. For example, the sensor data 112 captured at a given time (e.g., sensor time) may be temporally aligned with an image captured at approximately the same time (e.g., image time) as the sensor data 112, for example, by selecting images that were captured closest in time to the time at which the sensor data 112 was captured (e.g., at the sensor time).

For example, as shown in FIG. 1, the LIDAR sensor begins its sweep across the environment 104 at $t_0$ and continues its sweep until $t_1$. At $t_1$, the image capture device 106 captures image 114A. Thus, in this example, the sensor time $t_1$ is temporally aligned with the image time $t_1$, at which the image 114A was captured. In addition, at the sensor time $t_1$, the LIDAR sensor has swept only partially across the environment 104 being sensed (e.g., about one-third of the way across the environment 104 being sensed), and in the example shown this correlates to about the right-most third of the image 114A. As the LIDAR sensor continues its sweep from sensor time $t_1$ to $t_2$, the image capture device 106 at image time $t_2$ captures image 114B. Thus, the LIDAR data captured during the sensor time between times $t_1$ and $t_2$ mostly closely temporally corresponds to image time $t_2$. In addition, at between sensor times $t_1$ and $t_2$, the LIDAR sensor has swept partially across the environment 104 being sensed (e.g., from about one-third of the way across the environment 104 being sensed to about two-thirds of the way across the environment 104 being sensed), and in the example shown this correlates to about the center-most third of the image 114B. As the LIDAR sensor continues its sweep from sensor time $t_2$ to $t_3$, the image capture device 106 at image time $t_3$ captures image 114C. Thus, the LIDAR data captured during the sensor time between time $t_2$ and $t_3$ mostly closely temporally corresponds to image time $t_3$. In addition, between sensor times $t_2$ and $t_3$, the LIDAR sensor has swept from partially across the environment 104 being sensed (e.g., from about two-thirds of the way across the environment 104 being sensed to about fully across the environment 104 being sensed), and in the example shown this correlates to about the left-most third of the image 114C. In this example manner, at least some of images captured by the image capture device 106 may be correlated to at least a portion of the sensor data 112 captured by the sensor 108 (e.g., the LIDAR sensor).

In some examples, the LIDAR sensor may continue sweep through 360 degrees, during which some of the data captured does not correspond to the environment being sensed. In some examples, the data captured that does not correspond to the environment being sensed may be ignored or used for other purposes, such as, for example, calibrating the LIDAR sensor.

In those instances where the sensor data 112 is spatially projected into segmented image data 120, such projection may include a transformation determined using the relative extrinsics of the sensor(s) and the image device(s), as well as a dehomogenization using the camera matrix of the image device(s).

As shown in FIG. 1, projecting at least a portion of the sensor data 112 onto the segmented images 120A-120C creates a training dataset 124 that may be used to train a sensor data segmentation model 126 for automatically segmenting sensor data generated by a sensor of a type other than an image capturing device, as explained herein. For example, the objects in the environment 104 identified in the segmented images 120A-120C may be correlated to the sensor data 112, so features in the sensor data 112 may be used to identify similar objects in the future using the sensor of a type other than an image capture device. In some examples, the sensor data 112 may be used as additional training data for training the sensor data segmentation model 126.

Figure 2:
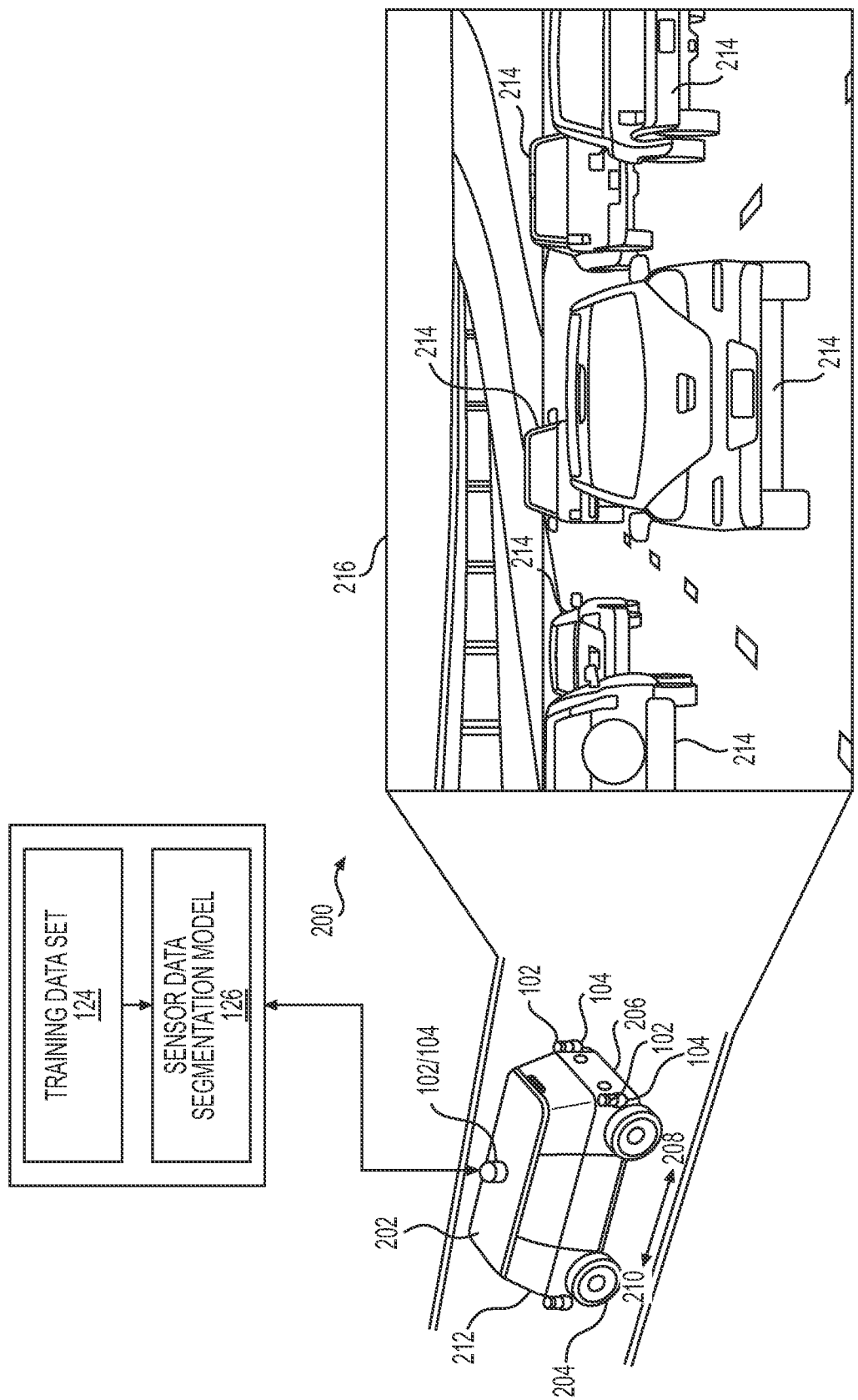
FIG. 2 is an example environment through which an example vehicle is travelling and capturing image data and sensor data.

FIG. 2 illustrates an example environment 200 through which an example vehicle 202 is traveling. The example vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 202 may be any configuration of vehicle, such as, for example, a van, a sport utility vehicle, a cross-over vehicle, a truck, a bus, an agricultural vehicle, and a construction vehicle. The vehicle 202 may be powered by one or more internal combustion engines, one or more electric motors, hydrogen power, any combination thereof, and/or any other suitable power sources. Although the example vehicle 202 has four wheels 204, the systems and methods described herein may be incorporated into vehicles having fewer or a greater number of wheels, tires, and/or tracks. The example vehicle 202 may have four-wheel steering and may operate generally with equal performance characteristics in all directions, for example, such that a first end 206 of the vehicle 202 is the front end of the vehicle 202 when travelling in a first direction 208, and such that the first end 206 becomes the rear end of the vehicle 202 when traveling in the opposite, second direction 210, as shown in FIG. 2. Similarly, a second end 212 of the vehicle 202 is the front end of the vehicle 202 when travelling in the second direction 210, and such that the second end 212 becomes the rear end of the vehicle 202 when traveling in the opposite, first direction 208. These example characteristics may facilitate greater maneuverability, for example, in small spaces or crowded environments, such as parking lots and urban areas.

A vehicle such as the example vehicle 202 may be used to travel through the environment 200 and collect data for generating a training dataset 124 for training the sensor data segmentation model 126. For example, the vehicle may include one or more image capture devices 102 and one or more sensors 104 of a type different than the image capture devices 102. For the purpose of illustration, the one or more sensors 104 may be one or more LIDAR sensors. Other sensor types are contemplated. In some examples, one or more of the image capture devices 102 and one or more of the sensors 104 may be mounted on the vehicle 202 in close proximity to one another, for example, to reduce differences in the perspectives and/or fields of view of the image capture devices 102 and sensors 104. This may reduce discrepancies between objects detected in the environment 200 by the image capture devices 102 and the sensors 104.

As the vehicle 202 travels through the environment 200, the image capture devices 102 and sensors 104 capture data associated with detected objects 214 (e.g., vehicles, pedestrians, buildings, barriers, etc.) concurrently or substantially simultaneously (within technical capabilities) within a field of view 216 of one or more of the image capture devices and sensors 104. The data captured may be used to create the training dataset 124, for example, as described with respect to FIGS. 1, 6, and 7.

Figure 3:
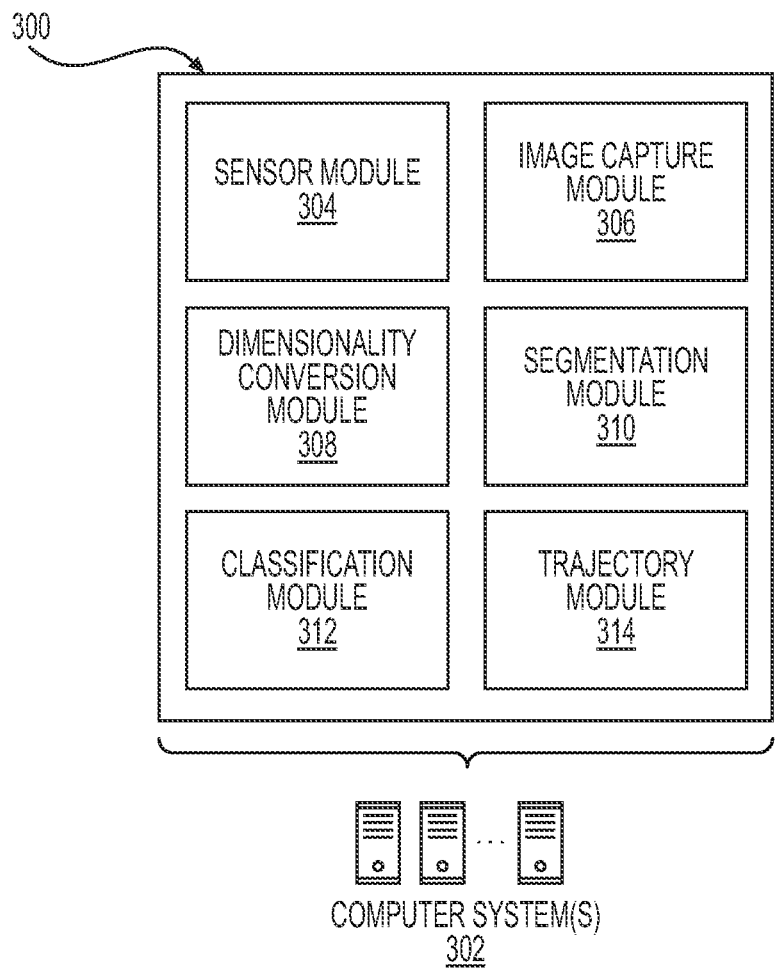
FIG. 3 is an example architecture for generating segmented images, training an example sensor data segmentation model, and segmenting sensor data.

FIG. 3 shows an example architecture 300 for implementing one or more of the example processes described herein. For example, the architecture 300 may include one or more computer systems 302 including various hardware and/or software to implement aspects of the systems, methods, and apparatuses described herein. For example, the computer system(s) 302 may include a sensor module 304 (e.g., a LIDAR module), an image capture module 306, a dimensionality conversion module 308, a segmentation module 310, a classification module 312, and a trajectory module 314.

In some examples, the computer system(s) 302 may be embodied in an autonomous vehicle, such as, for example, the example vehicle 202 shown in FIG. 2. In some examples, the computer system(s) 302 may provide perception and planning functionality for the autonomous vehicle. In general, the computer system(s) 302 may include LIDAR perception, vision (camera) perception, segmentation and classification, tracking and fusion, and prediction/planning.

The sensor module 304 may include one or more sensors 104, such as, for example, LIDAR sensors, to capture sensor data 114 for training data, segmentation, and/or classification, as described herein. For example, the sensor module 304 may be configured to combine or synthesize LIDAR data from a plurality of LIDAR sensors to generate a meta spin of LIDAR data, which may refer to LIDAR data generated by multiple LIDAR sensors. In the case of a meta spin of LIDAR data, the sensor module 304 may be configured to determine a virtual origin of the meta spin data (e.g., by mapping all of the sensor data to a common origin). In some examples, the sensor module 304 may be configured to determine a range between a LIDAR sensor and a point of an object or surface, and in some examples, the sensor module 304 may be configured to determine a surface normal vector for each point captured and/or sensed by the sensor module 304. As a non-limiting example, such a surface normal determination may be performed by calculating the normal of the cross product of vectors indicating directions from the point to two of the point's nearest neighboring points. As may understood in the context of this disclosure, the sensor module 304 may capture data and may transmit datasets to the computer system(s) 302 for subsequent processing.

The image capture module 306 may include one or more image capture devices 102 configured to capture image data 108 for image segmentation and/or classification, for example, as described herein. The image capture module 306 may include any number and/or type of image capture sensors. For example, the image capture module 306 may include image capture devices, such as any cameras (e.g., RGB-cameras, monochrome cameras, intensity (grey scale) cameras, infrared cameras, ultraviolet cameras, depth cameras, stereo cameras, and the like). As may understood in the context of this disclosure, the image capture module 306 may capture image data 108 and may transmit datasets to the computer system(s) 302 for subsequent processing. For example, data from the image capture module 306 may be included as one or more channels of a multi-channel image.

The computer system(s) 302 may include any number or type of other sensors suitable for use in an autonomous vehicle, for example. Various sensors may include, but are not limited to, one or more LIDAR sensors, one or more RADAR sensors, one or more SONAR sensors, ultrasonic transducers, wheel encoders, microphones, inertial measurement unit(s) (IMU(s)), accelerometers, gyroscopes, magnetometers, temperature sensors, humidity sensors, light sensors, a global positioning system (GPS), an inertial navigation system (INS), etc.

In some examples, the sensor module 304 and the image capture module 306 may provide one or more datasets to the computer system(s) 302 for combining and/or synthesizing the data for providing improved image segmentation and/or classification, generating training datasets, and/or providing a sensor data segmentation and/or classification. In some examples, the computer system(s) 302 may be configured to receive and store sensor datasets as described herein. In some examples, the computer system(s) 302 may be configured to annotate the stored data, which may include detecting, identifying, classifying, segmenting, labeling, etc., the data.

In some examples, the computer system(s) 302 may also include simulated data that has been generated by a computer simulation algorithm, for use in part in testing. In some examples, the simulated data may include any type of simulated data, such as image data, sensor data (e.g., LIDAR data), GPS data, etc. In some examples, the computer system(s) 302 may be configured to modify, transform, and/or perform converting operations on the simulated data for verifying an operation and/or for training models executable by machine learning networks.

Some examples of the dimensionality conversion module 308 may be configured to convert, transform, or map data having a first dimensionality to data having a second dimensionality. For example, the dimensionality conversion module 308 may be configured to convert one or more three-dimensional datasets to one or more multi-channel two-dimensional images. For example, the dimensionality conversion module 308 may be configured to convert and/or map the data stored in three dimensions to a different dimensional representation. Such a conversion may include, for example, associating sensor data described in cylindrical or spherical coordinates with planar coordinates. In some examples, such a conversion of cylindrical coordinates to planar coordinates may be envisioned as "unrolling" the cylindrical coordinates. The dimensionality conversion module 308, in some examples, may be configured to perform any conversion operations to convert the three-dimensional data to two-dimensional data, including but not limited to, spherical projections (e.g., stereographic and cylindrical), Mercator projection, direct polar conversion (e.g., spherical or equirectangular projection), etc. The channels of such a representation may be associated with a range (or distance) and an intensity.

The example segmentation module 310 may be configured to perform segmentation on one or more multi-channel two-dimensional images. For example, the segmentation module 310 may be configured to input the one or more multi-channel two dimensional images to or more machine learning algorithms. For example, the segmentation module 310 may perform image segmentation to segment objects represented in the data for subsequent image classification. In some examples, hardware and/or software configured to perform segmentation operations on data may be considered to be a "segmenter." In some examples, the segmentation module 310 may be configured to operate on any number of channels associated with the two-dimensional images. For example, the segmentation module 310 may receive one or more channels as inputs including, but not limited to, range channels, x-axis channels, y-axis channels, z-axis channels, surface normal vector channels, reflectivity channels, time channels, etc. In some examples, the segmentation module 310 may use any of one or more machine learning algorithms for performing segmentation. For example, the segmentation module 310 may utilize an artificial neural network, such as one or more convolutional neural networks (CNN), trained to segment multi-channel two-dimensional data. In some examples, the segmentation module 310 may be configured to use asymmetric kernels resulting in data pyramiding as discussed in more detail herein. In some instances, asymmetric strides of kernels (e.g., having a higher stride in an x-direction, as compared with a y-direction) may be applied and selected based on, for example, the number of channels (number of beams), number of points per revolution, and the like, so that data representations at higher abstractions (i.e., higher levels of the pyramid) are more uniform in both the x- and y-directions.

The example classification module 312 may be configured to receive segmented data and identify a type of object represented by the data. For example, the classification module 312 may classify one or more objects, including but not limited to cars, buildings, pedestrians, bicycles, trees, free space, occupied space, street signs, lane markings, etc. The classification module 312 and/or the segmentation module 310 may include any machine learning algorithms, such as, for example, neural networks, to perform operations of segmentation and classification.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

In some examples, the trajectory module 314 may be configured to receive segmented and/or classified data to determine trajectories for operation of an autonomous vehicle, such as, for example, the example vehicle 202. For example, the trajectory module 314 may be configured to receive segmented image data, segmented sensor data, and/or related classification information identifying free space on a road for an autonomous vehicle to travel, and generate a trajectory for the autonomous vehicle to follow. In some examples, the trajectory module 314 may receive as inputs the segmented and/or classified objects as discussed herein and may track objects to generate trajectories based at least in part on such objects.

Figure 4A:
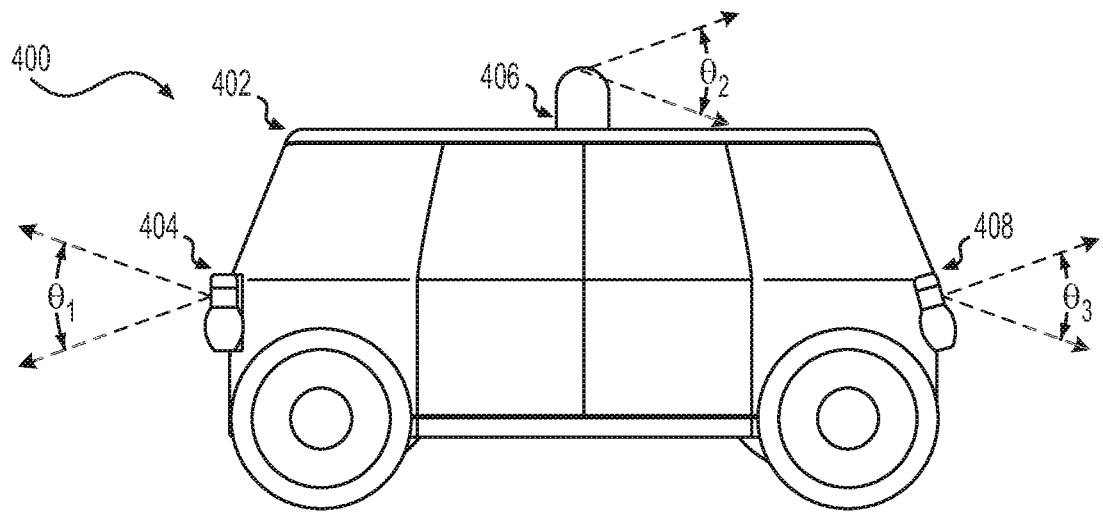
FIG. 4A depicts a side view of an example vehicle having multiple image capture devices and sensors.

FIG. 4A is a side view 400 of an example vehicle 202 having multiple sensor assemblies mounted on or carried by the vehicle 202. In some examples, datasets from the multiple sensor assemblies may be combined or synthesized to form a meta spin (e.g., LIDAR data representing a plurality of LIDAR sensors) or can be combined or fused using sensor fusion techniques to improve accuracy or processing for segmentation, classification, prediction, planning, trajectory generation, etc.

As shown in the side view 400, the example vehicle 202 may include any number of sensors in any combination or configuration. For example, the example vehicle 202 shown includes sensors 404, 406, and 408. In some examples, the sensor 404 may include a RADAR sensor having a vertical field of view illustrated as $\theta_1$. The example sensor 406 may include a LIDAR sensor mounted on a roof of the vehicle 202 and may have a vertical field of view illustrated as $\theta_2$. In some examples, the sensor 408 may include an image capture device, such as a camera, having a vertical field of view $\theta_3$. The vehicle 202 may include any number and type of sensors and is not limited to the examples shown and described with respect to FIG. 4A.

Figure 4B:
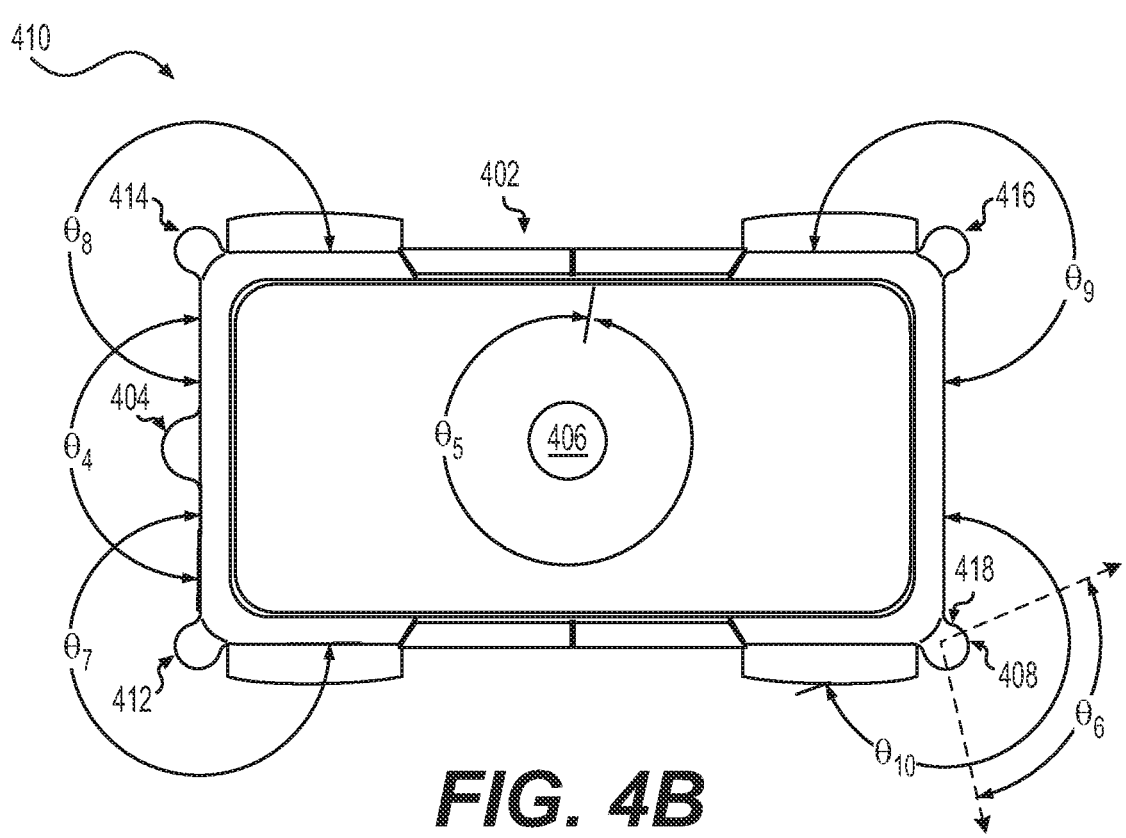
FIG. 4B depicts a top view of the example vehicle shown in FIG. 4A.

FIG. 4B is a top view 410 of the example vehicle 202 shown in FIG. 4A. As shown in FIG. 4B, the example vehicle 202 also includes sensors 412, 414, 416, and 418. For example, the sensors 408 and 418 may be co-located or located proximate to one another, but may include different sensor types or modalities, having various fields of view. In some examples, the sensors 412, 414, 416, and 418 may include LIDAR sensors, RADAR sensors, and/or image capture devices.

As shown in FIG. 4B, the sensor 404 may have a horizontal field of view $\theta_4$, the sensor 406 may have a horizontal field of view $\theta_5$, the sensor 408 may have a horizontal field of view $\theta_6$, the sensor 412 may have a horizontal field of view $\theta_7$, the sensor 414 may have a horizontal field of view $\theta_8$, the sensor 416 may have a horizontal field of view $\theta_9$, and the sensor 418 may have a horizontal field of view $\theta_{10}$. The mounting locations and/or fields of view of the sensors may have any number of configurations.

Figure 5A:
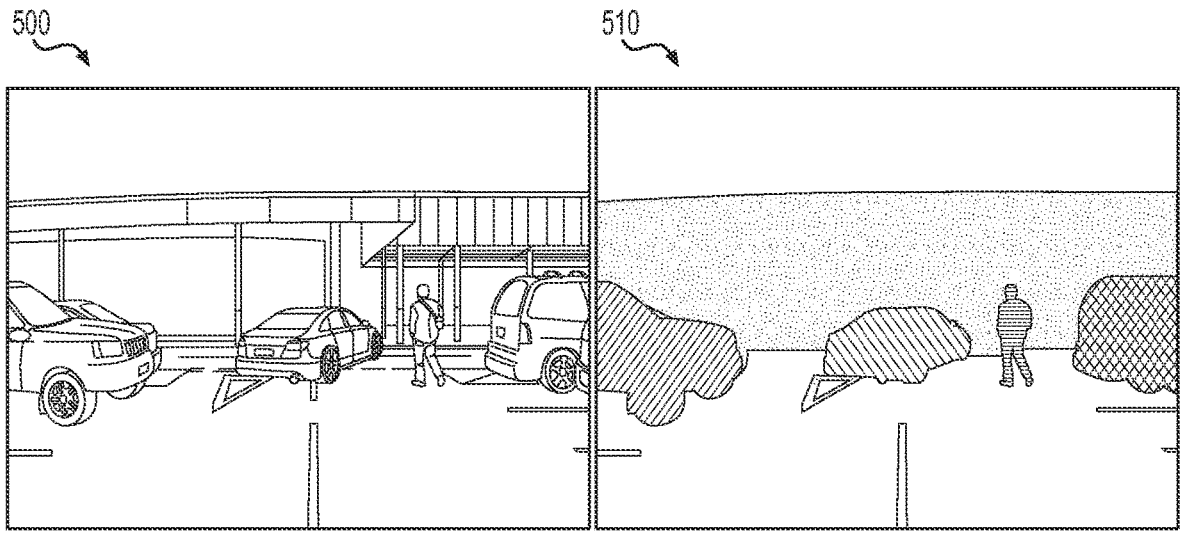
FIG. 5A depicts an example image including image data and a segmented version of the example image segmented for objects.
Figure 5B:
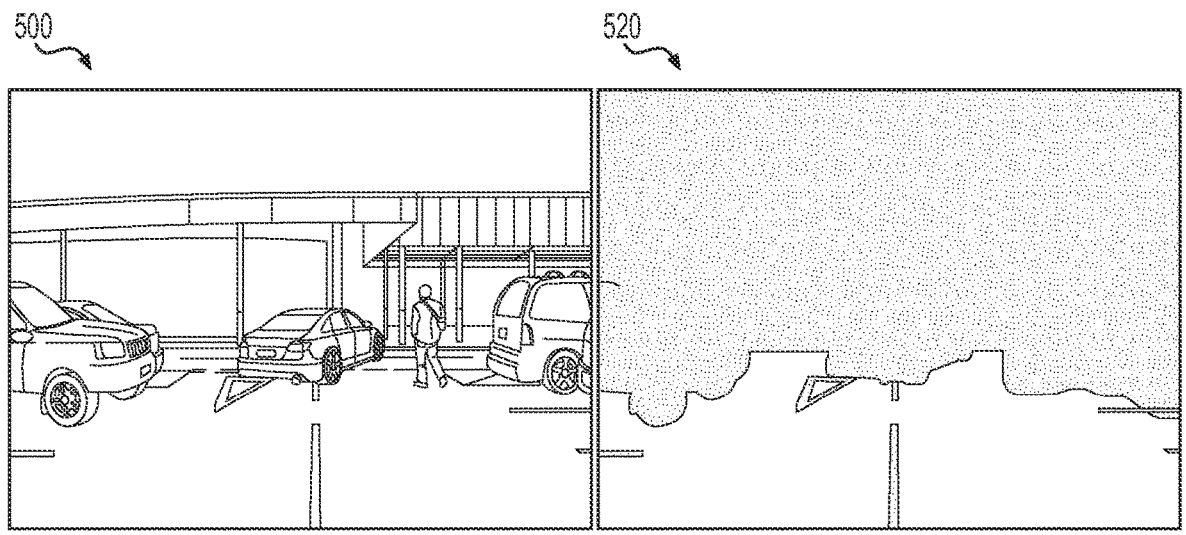
FIG. 5B depicts the example image shown in FIG. 5A and a segmented version of the example image segmented for drivable surfaces.

FIGS. 5A and 5B show examples of an input image and corresponding segmented images. Example input image 500 shown in FIG. 5A may correspond to an example object-segmented image 510. Segmentation of the image 500 may be performed to determine a number of meaningful representations of the image. For example, segmenting input image 500 based on objects present in the input image 500, may result in the object-segmented image 510 as shown. As depicted in FIG. 5A, each different shade of object-segmented image 510 corresponds to a different object (e.g., a car, a building, a pedestrian, a road marker, etc.). In the segmented form such as shown, it may be possible to determine locations, classifications, and/or the presence or absence of specific objects in the input image 500.

FIG. 5B shows an example of another possible segmentation schema for segmenting the input image 500. In contrast to the segmentation of input image 500 shown in FIG. 5A, the input image 500 may be segmented based on "free space," or potential regions though which a vehicle may travel. FIG. 5B illustrates an example representation of a free space-segmented image 520. The free space-segmented image 520 may provide information (e.g., various shades) for confidence of navigable pathways. As depicted in the example shown, the lighter shade of free space-segmented image 520 corresponds to road surfaces that are not obstructed by objects, such as, for example, other vehicles, buildings, or pedestrians. Such a segmentation may be useful for developing trajectories for autonomous vehicles, so that the vehicles may avoid collisions with objects in the environment.

Figure 6:
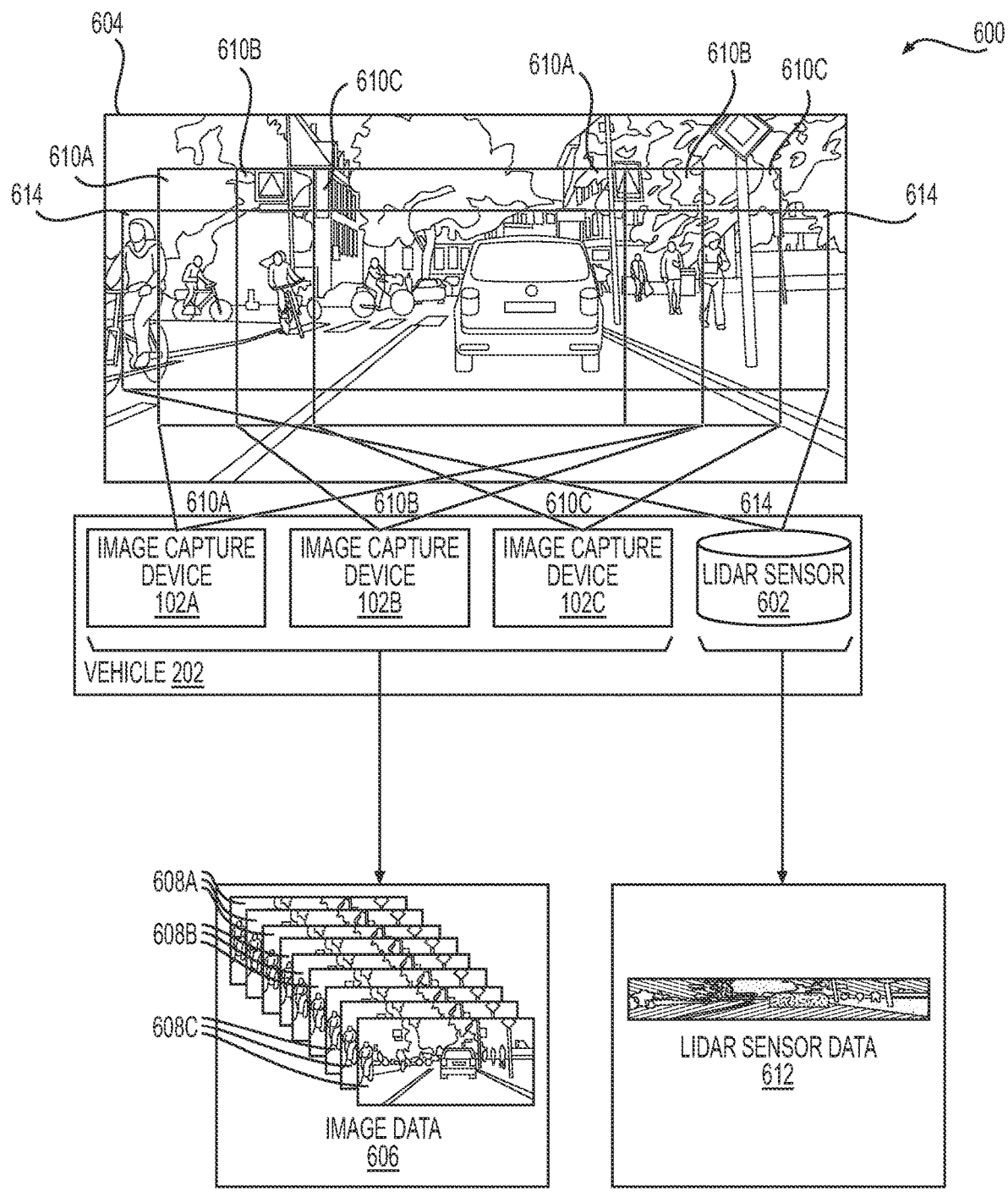
FIG. 6 is a pictorial flow diagram of an example process for capturing image data and sensor data.

FIG. 6 is a pictorial flow diagram 600 of an example process for capturing images and sensor data. In the example shown, three image capture devices 102A-102C and an example LIDAR sensor 602 capture data associated with a scene 604 in which the image capture devices 102A-102C and LIDAR sensor 602 are present. Although FIG. 6 shows three image capture devices 102A-102C and a single LIDAR sensor 602, fewer or more image capture devices are contemplated, and more than a single LIDAR sensor is contemplated. The image capture devices 102A-102C may be any type of image capture device configured to capture images representative of the environment, such as, for example, any cameras (e.g., RGB-cameras, monochrome cameras, intensity (grey scale) cameras, infrared cameras, ultraviolet cameras, depth cameras, stereo cameras, and the like).

In the example shown in FIG. 6, the three example image capture devices 102A-102C are depicted as capturing image data 606 in the form of images 608 corresponding to the respective fields of view 610A-610C of the of the image capture devices 102A-102C. For example, as schematically shown, the image capture device 102A captures images associated with the field of view 610A, the image capture device 102B captures images associated with the field of view 610B, and the image capture device 102C captures images associated with the field of view 610C. Although the images 608A-608C are schematically depicted as being identical in FIG. 6 due to the limitations inherent in the drawing, one or more (e.g., each) of the images 608A-608C will be slightly different due for example, to the slightly different views and times at which the images 608A-608C were captured. In the example shown, each of the image capture devices 102A-102C has a slightly different field of view 610 than the other image capture devices 102. In such examples, each image capture device 102A-102C may provide respective images 608A-608C having respective perspectives that are different and which encompass different portions of the scene 604. For example, the images 608A may correspond to three images captured by image capture device 102A at respective image times $t_1$, $t_2$, and $t_3$, the images 608B may correspond to three images captured by image capture device 102B at respective image times $t_1$, $t_2$, and $t_3$, and the images 608C may correspond to three images captured by image capture device 102C at respective image times $t_1$, $t_2$, and $t_3$. In some examples, the image data 606 captured by each of the image capture devices 102A-102C may be fused to generate a more complete representation of the scene 604.

As shown in FIG. 6, the example LIDAR sensor 602 is configured to capture LIDAR sensor data 612 from a field of view 614, which may be different than the fields of view 610A-610C associated with the image capture devices 102A-102C, for example, as shown in FIG. 6. In the example shown, the example field of view 614 of the LIDAR sensor 602 also has an aspect ratio different than the fields of view 610A-610C associated with the image capture devices 102A-102C. For example, the field of view 614 of the LIDAR sensor 602 is wider and narrower (i.e., shorter in height) than the respective fields of view 610A-610C of the image capture devices 102A-102C. This may be due to physical parameters of the sensor, such as, for example, a beam spread, a number of channels, etc. In examples where the field of view 614 of the LIDAR 104 is different than one or more of the fields of view 610A-610C of the image capture devices 102A-102C, the system described herein may be configured to account for such differences.

Figure 7:
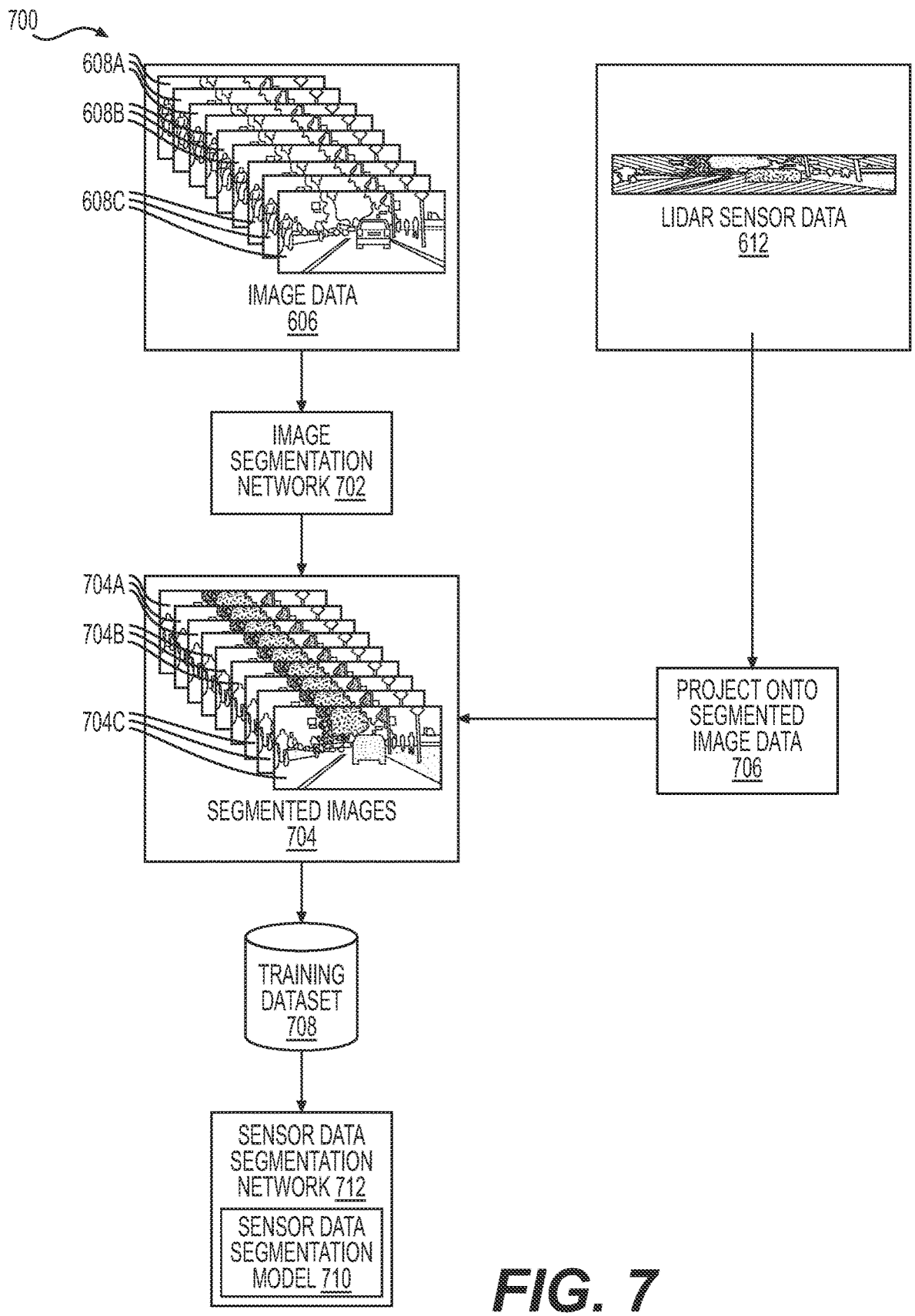
FIG. 7 is a pictorial flow diagram of an example process for segmenting the images shown in FIG. 6, projecting the sensor data captured in FIG. 6 onto the segmented images, and generating a training dataset.

FIG. 7 a pictorial flow diagram 700 of an example process for segmenting images, projecting LIDAR sensor data onto the segmented images to create a training dataset for training a sensor data segmentation model of a sensor data segmentation network. As shown in FIG. 7, image data 606 including images 608 (see FIG. 6) is transmitted to an image segmentation network 702 configured to automatically segment the images 608 to generate segmented images 704, for example, via algorithms and/or machine learning, which may predict a segmented image from an input image, for example, as explained herein.

As shown in FIG. 7, the LIDAR sensor 602 (see FIG. 6) generates LIDAR sensor data 612 representative of the scene 604 in which the LIDAR sensor 602 is present. At 706, the LIDAR sensor data 612 is projected onto the segmented images 704A-704C. The LIDAR sensor data 612 is projected onto segmented images 704A-704C, such that the LIDAR sensor data 612 and the segmented images 704A-704C are substantially temporally aligned (within technical capabilities), for example, as described above with respect to FIG. 1. In addition, the LIDAR sensor data 612 may be projected onto the segmented images 704A-704C, so that the LIDAR sensor data 612 associated with objects in the scene 604 is substantially spatially aligned with the objects in the segmented images 704A-704C (within technical capabilities), for example, as described above with respect to FIG. 1.

As shown in FIG. 7, projecting the LIDAR sensor data 612 onto the segmented images 704A-704C creates a training dataset 708 that may be used to train a sensor data segmentation model 710 of a sensor data segmentation network 712 for automatically segmenting LIDAR sensor data generated by a LIDAR sensor. For example, once trained, such a segmentation model 710 may take raw sensor data (e.g., LIDAR sensor data 612) as input to segment objects in the future using LIDAR sensors. In some examples, sensor data captured by LIDAR sensors may be used as additional training data for training the sensor data segmentation model 710 of the sensor data segmentation network 712.

The sensor data segmentation network 712 may include any type of machine learning model described herein. For example, the sensor data segmentation network 712 may be a CNN. In some examples, the sensor data segmentation network 712 may include more than one machine learning network. As explained herein, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

In some examples (e.g., those examples in which a CNN is used), the sensor data segmentation network 712 may include symmetric and/or asymmetric kernels (e.g., kernels that are square or non-square) to segment the sensor data (e.g., LIDAR sensor data 612) in a manner such that the stride is asymmetric (i.e., the step between the kernel applications along a length dimension may be higher than the steps in a height dimension). In some such examples, successive applications of the kernels using the asymmetric stride may result in data pyramiding in a manner that increases a receptor field. Such a stride may be selected based on, for example, physical parameters of the sensor data such as, but not limited to, a number of channels, width between channels, number of data returns per revolution, etc. This may facilitate segmenting the sensor data (e.g., the LIDAR sensor data 612) as such pyramiding may increase the receptive field of the network and result in more efficient use of data and computing power when making those projections.

To produce a valid output, a machine learning network, such as, for example, a CNN, must first learn a set of parameters, or be "trained." Training is accomplished by inputting a dataset into the network, the dataset being associated with expected output values. These expected output values may generally be referred to as "ground truth." For example, a ground truth may include an identification of specific objects in an image, as well as a semantic classification or label associated with the object (e.g., identifying and labeling an object as a car or a building). The accuracy of a network may be based on the amount and/or accuracy of data provided in the training dataset. As a result, an appropriate dataset to train a network to output segmented sensor data would include sensor data having known, or previously determined, segments. In some examples, training datasets may include one or more segmented images representative of real-world scenes correlated with one or more sensor datasets representative of real-world scenes, which may be annotated by hand or via one or more algorithms configured to segment, detect, classify, and/or label objects in the sensor datasets. As a non-limiting example, raw LIDAR sensor data may be input to the network, the output of which may be compared to a corresponding segmented set of LIDAR data (i.e., the ground truth) to update internal parameters, as discussed in detail below. As an example, such ground truth may be the LIDAR data with associated segmentation provided by the corresponding image data. In some examples, a training dataset may include synthetic (e.g., computer generated) data that include annotated objects or that has been annotated by a computer algorithm. Training can be performed using offline data and/or online data.

Loss functions may be used to adjust internal parameters of the network during training. The loss functions are functions of the expected output (or ground truth) values for the dataset and values output by the network. Information contained in loss functions may be sent through the network as back propagations to adjust internal parameters, thereby tuning the network to provide valid outputs. All else being equal, the more data used to train a network, the more reliable the network may be (e.g., in providing accurate segmentations and/or classifications).

One example of such a loss function that may be used to train a network to segment sensor data, such as LIDAR data, is the softmax function, though any other function of input data with expected, or ground truth, segmented data is contemplated. Other exemplary loss functions include, but are not limited to, support vector machine (SVM) loss, hinge loss, etc.

In some examples, ground truth for the sensor data segmentation network 712 may be provided by the segmented images 704. In some examples, the images may be automatically segmented using the image segmentation network 702 (e.g., a CNN) to obtain the segmented images 704, and the sensor data as associated with the segmented images 704 may be used as the ground truth for training the sensor data segmentation model 710 of the sensor data segmentation network 712 to automatically segment sensor data obtained from a sensor that is not an image capture device. For example, the LIDAR sensor data 612 associated with the segmented images 704 may be used as ground truth for LIDAR sensor data obtained from a LIDAR sensor. As schematically shown in FIG. 7, the LIDAR sensor data 612 obtained while the image data 606 is being captured and segmented may be projected onto the segmented images 704 to obtain the training dataset 708, which may be used to train the sensor data segmentation model 710 run by the sensor data segmentation network 712, which may be a CNN or any type of network described herein. As explained above, the raw sensor data may be input to the network. The resulting output may then be compared to the sensor data with associated segmentations as provided by the segmented images 704 (e.g., the ground truth). Such a comparison may be determined by a loss function (or cost function), which drives the variation of network parameters. In some examples, the loss function may be a cross-entropy softmax loss, a focal loss, a logistic regression loss, or the like.

In some examples, the sensor data segmentation network 712 may be trained for object segmentation, for example, by segmenting input data based on objects contained in the input data. Other segmentation types are contemplated. For example, the sensor data segmentation network 712 may be trained to identify "free spaces," or areas in the sensor data that would provide a suitable path for planning a trajectory for an autonomous vehicle, for example, similar to the free space segmentation shown in FIG. 5B. In such examples, the free spaces defined in the segmented sensor data may be used to generate trajectories for operation of an autonomous vehicle. In addition, the sensor data segmentation network 712 may be trained to find occupied space, or areas encompassed by a sensor that would not provide a suitable path for a trajectory of an autonomous vehicle.

Figure 8:
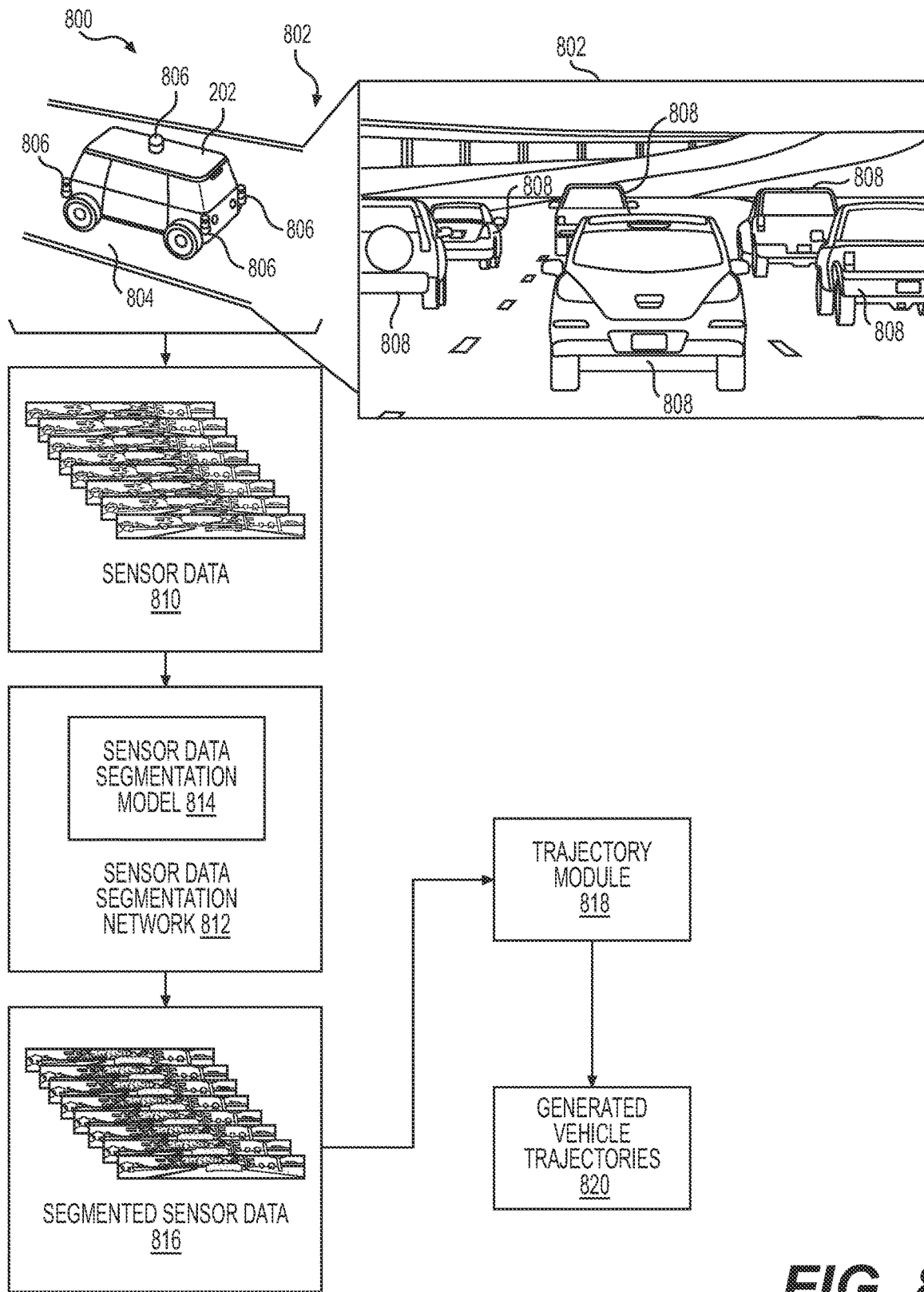
FIG. 8 is a pictorial flow diagram of an example process for capturing sensor data and segmenting the sensor data using an example sensor data segmentation network to generate segmented sensor data for use by a trajectory module to generate vehicle trajectories.

FIG. 8 schematically depicts is a pictorial flow diagram 800 of an example process for capturing sensor data and segmenting the sensor data using an example sensor data segmentation network to generate segmented sensor data for use by a trajectory module configured to generate vehicle trajectories for an autonomous vehicle. In the example shown, the example vehicle 202 travels autonomously through the environment 802 on a road 804. Example sensors 806 are mounted on the vehicle 202 for detecting objects 808 in the environment 802. The sensors 806 may include a number of sensor types, such as, for example, image capture devices and/or other sensor types described herein, including LIDAR sensors. The sensors 806 sense the objects 808 in the environment 802 and generate sensor data 810 in the form of signals indicative of the objects 808.

In some examples, the sensors 806 may include image capture devices and a second sensor type other than an image capture device, such as, for example, a LIDAR sensor. In such examples, the one or more LIDAR sensors may be configured to generate LIDAR sensor data 810. The LIDAR sensor data 810 may be communicated to a sensor data segmentation network 812 configured to segment the LIDAR sensor data 810 (e.g., automatically segment the LIDAR sensor data 810) using a sensor data segmentation model 814. In some example, the sensor data segmentation model 814 may be configured to identify and/or classify the objects 808 and/or free space sensed by the one or more LIDAR sensors to provide segmented sensor data 816 (e.g., segmented LIDAR sensor data). The segmented sensor data 816 may be communicated to a trajectory module 818 configured to generate vehicle trajectories 820 for the vehicle 202 to follow as it travels through the environment 802.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 300 (see FIG. 3) is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 300. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 300 may be transmitted to the architecture 300 via transmission media or signals, such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 202 (see FIG. 2) is discussed below.

Figure 9:
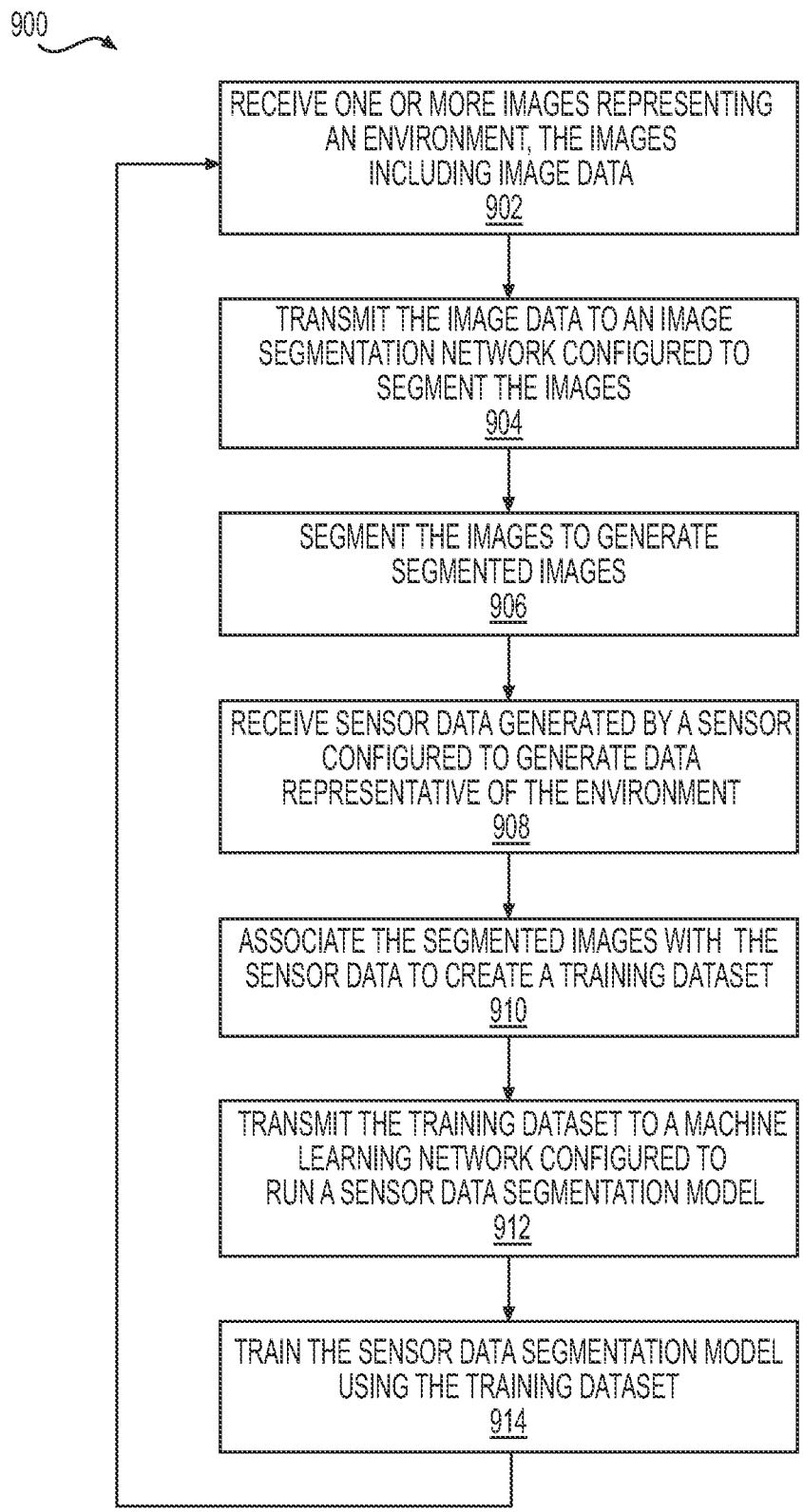
FIG. 9 is a flow diagram of an example process for training an example sensor data segmentation model using an example training dataset including segmented images and sensor data.
Figure 10:
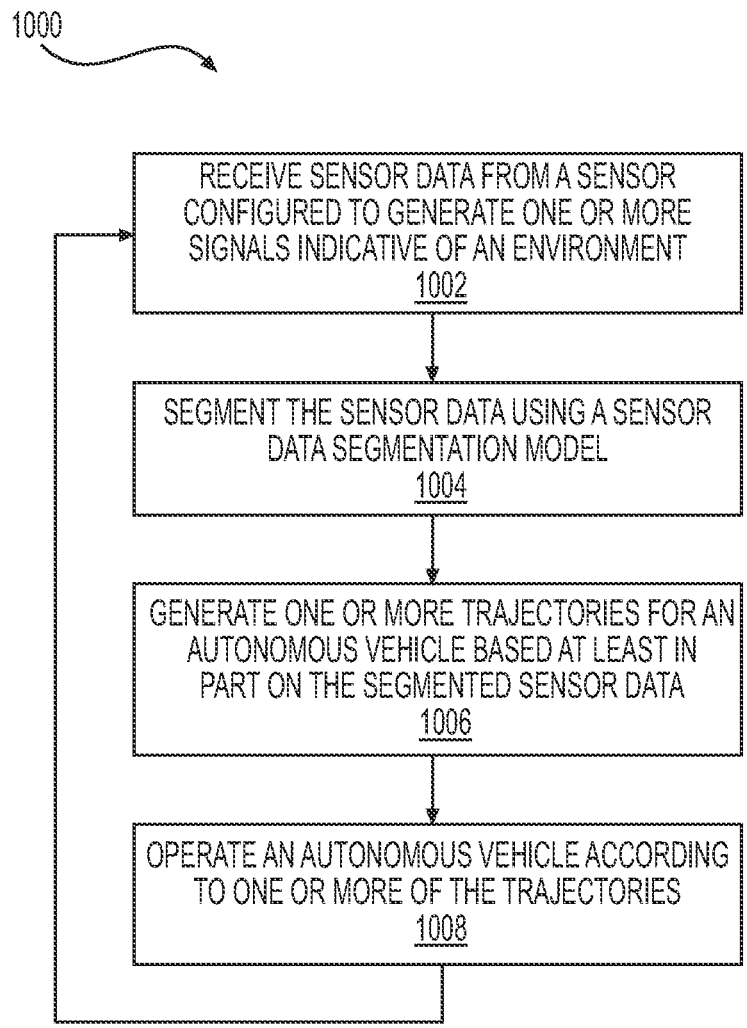
FIG. 10 is a flow diagram of an example process for segmenting sensor data using an example sensor data segmentation model.

FIGS. 9 and 10 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 9 is a flow diagram of an example process 900 for training an example sensor data segmentation model using an example training dataset including segmented images and sensor data. At 902, the example process may include receiving one or more images representing an environment, where the images include image data generated by an image capture device.

At 904, the example process 900 may also include transmitting the image data to an image segmentation network configured to segment the images and generate segmented images. For example, the images may be automatically segmented using a machine learning network, such as, for example, a CNN. As explained herein, image segmentation by other types of machine learning models or computer vision techniques is contemplated.

The example process 900, at 906, may include segmenting the image data to generate segmented images. For example, the images may be automatically segmented by a machine learning network, such as a CNN. Such segmentation, for example, may divide the image based on objects detected, based on a free-space determination, or the like.

At 908, the example process 900 may also include receiving sensor data generated by a sensor configured to generate data representative of the environment. In some examples, the sensor may be a sensor of a type other than an image capture device. For example, the sensor may be a LIDAR sensor, and sensor data may be LIDAR sensor data. Other sensor types and data from such sensors are contemplated, such as, but not limited to, RADAR(s), ultrasonic transducer(s), and the like.

At 910, the example process 900 may also include associating the sensor data with segmented images to create a training dataset (e.g., a set including the raw sensor data and an associated set of sensor data with corresponding segmentation information). For example, associating the sensor data with the segmented images may include projecting the sensor data onto the segmented images and associating the segmentation information from the segmented image with the sensor data. In some examples, each of the images is captured at respective image times, and the sensor data is captured at a sensor time. Associating the sensor data with the segmented images may include selecting image data captured at image times minimizing a difference between the image time and the sensor time, and associating the sensor data with the selected images. Associating the sensor data with the segmented images may in some examples include aligning the sensor data with the segmented images. In some examples, aligning the sensor data with the segmented images may include aligning the sensor data with the segmented images temporally and/or spatially. In some examples, associating the sensor data with the segmented images may also include identifying image data associated with large depth discontinuities, and ignoring image data associated with such discontinuities of the segmented images when associating the sensor data with the segmented images to create a training dataset. This may reduce the likelihood of creating errors in the training dataset.

The example process 900, at 912, may also include transmitting the training dataset to a machine learning network configured to run a sensor data segmentation model (i.e., determine a sensor data segmentation using the sensor data segmentation model).

At 914, the example process 900 may further include training the sensor data segmentation model using the training dataset, such that the sensor data segmentation model is configured to segment sensor data obtained from the sensor. For example, receiving sensor data generated by a sensor may include receiving sensor data generated by a LIDAR sensor, and training the sensor data segmentation model may include training the sensor data segmentation model using the training dataset (e.g., by backpropagating errors computed in a loss function of the sensor data associated with the segmented image data and the output of the network), such that the sensor data segmentation model is configured to segment sensor data obtained from LIDAR.

FIG. 10 is a flow diagram of an example process 1000 for segmenting sensor data using an example sensor data segmentation model. At 1002, the example process may include receiving sensor data from a sensor configured to generate signals indicative of an environment in which the sensor is located. For example, the sensor may be a sensor of a type other than an image capture device. For example, the sensor may be a LIDAR sensor configured to generate LIDAR sensor data representative of the environment in which the sensor is located, though any other sensor type is contemplated.

At 1004, the example process 1000 may also include segmenting the sensor data received from the sensor using a sensor data segmentation model, such as, for example, the sensor data segmentation models described herein. For example, the sensor data segmentation model may be configured to facilitate identification and/or classification of objects in the environment detected by the sensor. In some examples, the sensor data segmentation model may be configured to facilitate identification of free space in the environment. In some examples, the sensor data segmentation model may be trained using segmented image data to provide ground truth, for example, as described herein. In some examples, the sensor data segmentation model may be trained by additional data captured by the sensor and/or other sensors of the same type and/or different types.

At 1006, the example process 1000 may also include generating one or more trajectories for an autonomous vehicle based at least in part on the segmented sensor data. For example, a trajectory module of a perception system may be configured to receive the segmented sensor data and generate one or more trajectories based at least in part on the segmented sensor data.

At 1008, the example process 1000 may further include operating the autonomous vehicle according to one or more of the trajectories.

Figure 11:
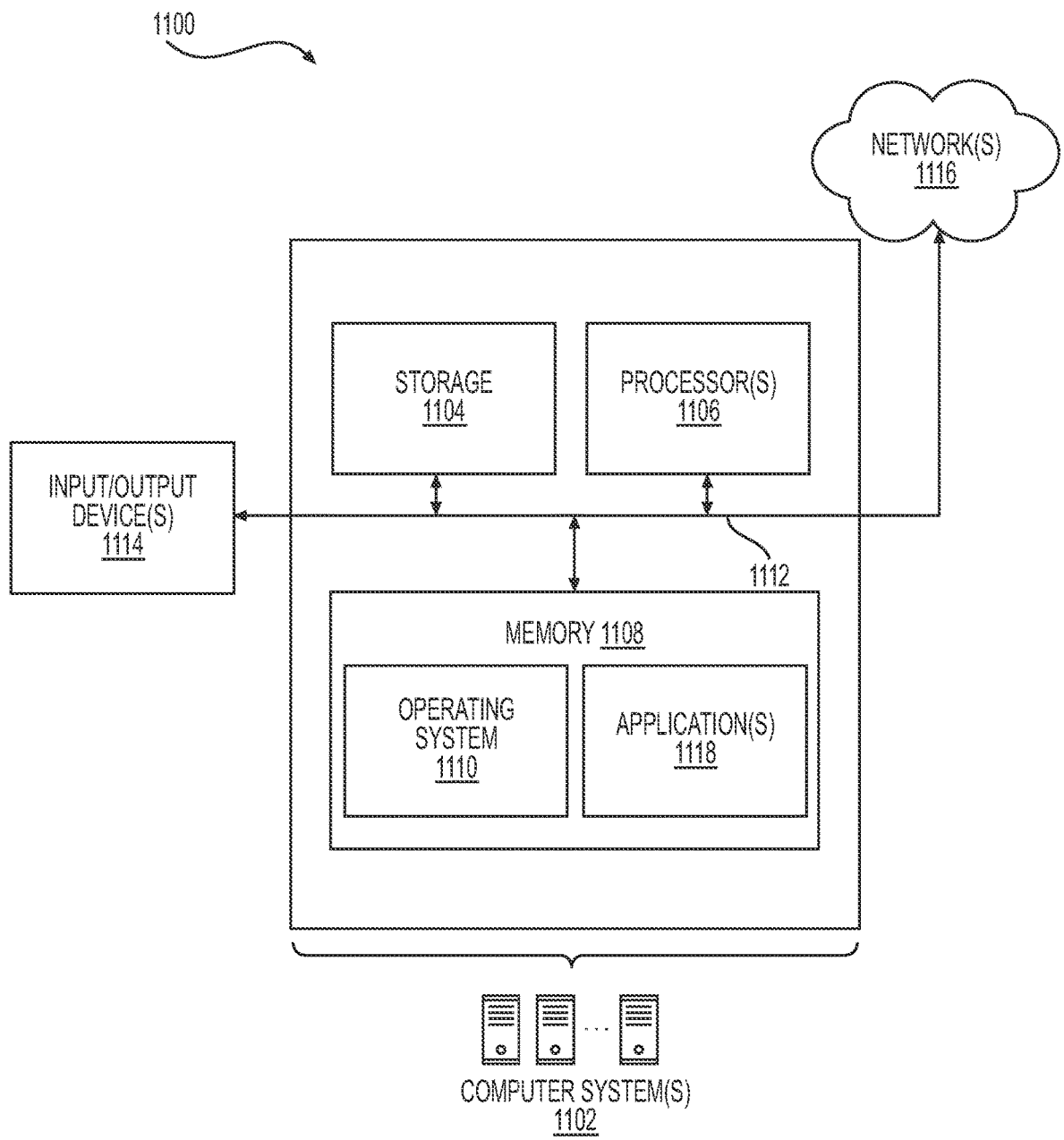
FIG. 11 depicts a block diagram of an example computer architecture for implementing the processes described herein.

FIG. 11 is a block diagram of an example computer architecture 1100 for implementing processes described herein. The example, architecture 1100 includes one or more computer systems 1102 that may include a storage 1104, one or more processor(s) 1106, and a memory 1108 including an operating system 1110. The storage 1104, the processor(s) 1106, the memory 1108, and the operating system 1110 may be communicatively coupled over a communication infrastructure 1112. In some examples, the computer system(s) 1102 may interact with a user, or environment, via input/output (I/O) device(s) 1114, as well as one or more other computing devices over one or more networks 1116, via the communication infrastructure 1112. The operating system 1110 may interact with other components to control one or more applications 1118 in the memory 1108.

In some examples, the computer system(s) 1102 may correspond to the computer system(s) 302 of FIG. 3. The computer system(s) 302 may implement any hardware and/or software to implement the modules 304, 306, 308, 310, 312, and 314 to perform the image analysis and/or sensor data analysis discussed herein.

The systems and methods described herein may be implemented in software or hardware or any combination thereof. The systems and methods described herein may be implemented using one or more computing devices, which may or may not be physically or logically separate from each other. The methods may be performed by components arranged as either on-premise hardware, on-premise virtual systems, or hosted-private instances. Additionally, various aspects of the methods described herein may be combined or merged into other functions.

A processor or computer system may be configured to particularly perform some or all of the methods described herein. In some examples, the methods may be partially- or fully-automated by one or more computers or processors. The systems and methods described herein (or any part(s) or function(s) thereof) may be implemented using hardware, software, firmware, or a combination thereof and may be implemented in one or more computer systems or other processing systems. In some examples, the illustrated system elements may be combined into a single hardware device or separated into multiple hardware devices. If multiple hardware devices are used, the hardware devices may be physically located proximate to or remotely from each other. The examples of the methods described and illustrated are intended to be illustrative and not limiting. For example, some or all of the steps of the methods may be combined, rearranged, and/or omitted in different examples.

In some examples, the systems and methods described herein may be directed to one or more computer systems capable of carrying out the functionality described herein. Example computing devices may be, but are not limited to, a personal computer (PC) system running any operating system, such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, for example, but not limited to, an interactive television (iTV), a video on demand system (VOD), and via a digital video recorder (DVR), or other on demand viewing system.

The systems described herein may include one or more processors. The processor(s) may be connected to a communication infrastructure, such as, but not limited to, a communications bus, cross-over bar, or network, etc. The processes and processors need not be located at the same physical locations. In other words, processes may be executed at one or more geographically distant processors, over for example, a LAN or WAN connection. Computing devices may include a display interface that may forward graphics, text, and other data from the communication infrastructure for display on a display unit.

The computer system, in some examples, may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some examples, a machine-accessible medium may refer to any storage device used for storing data accessible by a computer. Examples of a machine-accessible medium may include, but are not limited to, a magnetic hard disk; a floppy disk; an optical disk, at least similar to a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices may include, as non-limiting examples, magnetic disks (including internal hard disks and removable disks), magneto-optical disks, optical disks, read-only memory, random access memory, and/or flash storage. Storage devices suitable for tangibly embodying computer program instructions and data may also include all forms of non-volatile memory, including, for example, semiconductor memory devices, such as EPROM, EEPROM, and flash memory devices; magnetic disks, such as internal hard disks and removable disks; magneto-optical disks; and CD-ROM and DVD-ROM discs. The processor and the memory may be supplemented by, or incorporated in, ASICs (application-specific integrated circuits).

The processing system may be in communication with a computerized data storage system. The data storage system may include a non-relational or relational data store, such as a MySQL™ or other relational database. Other physical and logical database types may be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some examples, the processing system may use object-oriented programming and may store data in objects. In such examples, the processing system may use an object-relational mapper (ORM) to store the data objects in a relational database. The systems and methods described herein may be implemented using any number of physical data models. In some examples, a relational database management system (RDBMS) may be used. In such examples, tables in the RDBMS may include columns that represent coordinates. Data may be stored in tables in the RDBMS. The tables may have pre-defined relationships between them. The tables may also have adjuncts associated with the coordinates.

In some examples, secondary memory may include other similar devices for allowing computer programs or other instructions to be loaded into computer systems. Such devices may include, for example, a removable storage unit and an interface. Examples of such may include a program cartridge and cartridge interface (such as, for example, but not limited to, those found in video game devices), a removable memory chip (such as, for example, but not limited to, an erasable programmable read only memory (EPROM), or programmable read only memory (PROM) and associated socket), and other removable storage units and interfaces, which may allow software and data to be transferred from the removable storage unit to the computer system.

The computing system may also include an input device, such as, but not limited to, a voice input device, such as a microphone, touch screens, gesture recognition devices, such as cameras, other natural user interfaces, a mouse or other pointing device, such as a digitizer, and a keyboard or other data entry device. The computer system may also include output devices, such as, but not limited to, a display and a display interface. The computing system may include input/output (I/O) devices, such as, but not limited to, a communications interface, cable and communications path, etc. These devices may include, but are not limited to, a network interface card and modems. Communications interface(s) may allow software and data to be transferred between a computer system and one or more external devices.

In some examples, the computer system may be operatively coupled to an automotive system. Such an automotive system may be either manually operated, semi-autonomous, or fully autonomous. In such examples, input and output devices may include one or more image capture devices, controllers, microcontrollers, and/or other processors to control automotive functions, such as, but not limited to, acceleration, braking, and steering. Further, communication infrastructure in such examples may also include a Controller Area Network (CAN) bus.

In some examples, the computer system may be operatively coupled to any machine vision-based system. For example, such machine vision-based systems may include, but are not limited to, manually operated, semi-autonomous, or fully autonomous industrial or agricultural robots, household robots, inspection systems, security systems, etc. For example, the examples described herein are not limited to one particular context and may be applicable to any application utilizing machine vision.

Some examples may be practiced in the environment of a computer network or networks. The network may include a private network or a public network (e.g., the Internet), or a combination of both. The network may include hardware, software, or a combination of both.

From a telecommunications-oriented view, the network may be described as a set of hardware nodes interconnected by a communications facility, with one or more processes (hardware, software, or a combination thereof) functioning at each node. The processes may inter-communicate and exchange information with one another via communication pathways between them using interprocess communication pathways. On these pathways, appropriate communications protocols may be used.

An example computer and/or telecommunications network environment may include nodes, which may include hardware, software, or a combination of hardware and software. The nodes may be interconnected via a communications network. Each node may include one or more processes executable by processors incorporated into the nodes. A single process may be run by multiple processors, or multiple processes may be run by a single processor, for example. Additionally, each of the nodes may provide an interface point between the network and the outside world, and may incorporate a collection of sub-networks.

In some examples, the processes may communicate with one another through interprocess communication pathways supporting communication through any communications protocol. The pathways may function in sequence or in parallel, continuously or intermittently. The pathways may use any of the communications standards, protocols or technologies, described herein with respect to a communications network, in addition to standard parallel instruction sets used by many computers.

The nodes may include any entities capable of performing processing functions. Examples of such nodes that may be used with the examples herein may include computers (such as personal computers, workstations, servers, or mainframes), handheld wireless devices and wireline devices (such as personal digital assistants (PDAs), modem cell phones with processing capability, wireless e-mail devices, including but not limited to BlackBerry™ devices), document processing devices (such as scanners, printers, facsimile machines, or multifunction document machines), or complex entities (such as local-area networks or wide-area networks), to which are connected a collection of processors, as described. For example, a node itself may be a wide-area network (WAN), a local-area network (LAN), a private network (such as a Virtual Private Network (VPN)), or a collection of networks.

Communications between the nodes may be made possible by a communications network. A node may be connected either continuously or intermittently with the communications network. As an example, a communications network may be a digital communications infrastructure providing adequate bandwidth and information security.

The communications network may include wireline communications capability, wireless communications capability, or a combination of both, at any frequencies, using any type of standard, protocol, or technology. In addition, in some examples, the communications network may be a private network (e.g., a VPN) or a public network (e.g., the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example, non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP), and user datagram protocol (UDP). Any other known or anticipated wireless or wireline protocols and technologies may be used.

Examples disclosed herein may include apparatuses for performing the operations described herein. An apparatus may be specially constructed for the desired purposes, or it may include a general purpose device selectively activated or reconfigured by a program stored in the device.

Some examples may be embodied in machine-executable instructions. The instructions may be used to cause a processing device, for example, a general-purpose or special-purpose processor, which is programmed with instructions to perform the steps of the processes described herein. Alternatively, the steps of the described herein may be performed by specific hardware components that contain hardwired logic for performing the steps, or by any combination of programmed computer components and custom hardware components. For example, the systems and processes described herein may be provided as a computer program product, as outlined above. Some examples may include a machine-readable medium having instructions stored thereon. The instructions may be used to program any processor or processors (or other electronic devices) to perform a process or method according to the examples described herein. In addition, some examples may be downloaded and stored on a computer program product. In such examples, the program may be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The processes may be implemented in a computer program product accessible from a computer-usable or computer-readable storage medium that provides program code for use by, or in connection with, a computer or any instruction execution system. A computer-usable or computer-readable storage medium may be any apparatus that is capable of containing or storing the program for use by, or in connection with, the computer or instruction execution system, apparatus, or device.

A data processing system suitable for storing and/or executing the corresponding program code may include at least one processor coupled directly or indirectly to computerized data storage devices, such as memory elements. Input/output (I/O) devices, including, but not limited to, keyboards, displays, pointing devices, etc., may be coupled to the system. Network adapters may also be coupled to the system to enable the data processing system to become coupled to other data processing systems or remote printers or storage devices through intervening private or public networks. To provide for interaction with a user, the features may be implemented on a computer with a display device, such as an LCD (liquid crystal display) or another type of monitor for displaying information to the user, and a keyboard and an input device, such as a mouse or trackball, by which the user may provide input to the computer.

A computer program may be a set of instructions that may be used, directly or indirectly, in a computer. The systems and methods described herein may be implemented using programming languages, such as, for example, CUDA, OpenCL, Flash™, JAVA™, C++, C, C #, Python, Visual Basic™, JavaScript™ PHP, XML, HTML, etc., or a combination of programming languages, including compiled or interpreted languages, and may be deployed in any form, including as a stand-alone program or as a module, component, subroutine, or other unit suitable for use in a computing environment. The software may include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system may be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device, such as a read-only memory, a random-access memory, both, or any combination of the data storage devices described herein. A processor may include any processing circuitry or control circuitry operative to control the operations and performance of an electronic device.

The systems, modules, and methods described herein may be implemented using any combination of software or hardware elements. The systems, modules, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. An example system comprises:
one or more processors; and
one or more computer readable storage media communicatively coupled to the one or more processors and storing instructions executable by the one or more processors to:
  receive a plurality of images representing an environment, the plurality of images comprising image data generated by one or more image capture devices;
  transmit the image data to an image segmentation network configured to segment the plurality of images and generate segmented images;
  receive first sensor data associated with the environment, the first sensor data received from a light detection and ranging (LIDAR) sensor;
  associate the first sensor data with the segmented images to create a training dataset;
  transmit the training dataset to a machine learning network configured to run a sensor data segmentation model; and
  train the sensor data segmentation model using the training dataset, such that the sensor data segmentation model is configured to segment second sensor data received from a LIDAR sensor.

B. The system of example A, wherein the instructions are further executable by the one or more processors to:
project at least a first portion of the first sensor data onto a first segmented image of the segmented images; and
project at least a second portion of the first sensor data onto a second segmented image of the segmented images.

C. The system of example A or example B, wherein:
a first image of the plurality of images is captured at a first image time;
a second image of the plurality of images is captured at a second image time;
a first portion of the first sensor data is associated with a first sensor time;
a second portion of the first sensor data is associated with a second sensor time; and
the instructions are further executable by the one or more processors to:
determine a first time difference between the first image time and the first sensor time;
determine a second time difference between the second image time and the first sensor time;
determine that the first time difference is less than the second time difference; and
associate the first image with the first portion of the first sensor data based at least in part on the first time difference being less than the second time difference.

D. The system of any one of example A through example C, wherein the instructions are further executable by the one or more processors to receive second sensor data from the first sensor and segment second sensor data based at least in part on the trained sensor data segmentation model.

E. The system of any one of example A through example D, wherein the sensor data segmentation model comprises one or more kernels, the one or more kernels associated with an asymmetric stride, and
wherein training the sensor data segmentation model comprises computing a loss function, the loss function based at least in part on an output of the sensor data segmentation model and the training dataset, the loss function comprising one or more of a cross-entropy softmax loss, a focal loss, or a logistic regression loss.

F. The system of any one of example A through example E, wherein the instructions are further executable by the one or more processors to:
identify discontinuities in the sensor data; and
delete sensor data associated with the discontinuities.

G. The system of any one of example A through example F, wherein the instructions are further executable by the one or more processors to:
receive sensor data from a LIDAR sensor; and
segment the sensor data received from the LIDAR sensor using the sensor data segmentation model and generate segmented sensor data.

H. The system of any one of example A through example G, wherein the instructions are further executable by the one or more processors to generate a trajectory for an autonomous vehicle based at least in part on the segmented sensor data.

I. An example method comprises:
receiving a plurality of images representing an environment, the plurality of images comprising image data generated by an image capture device;
transmitting the image data to an image segmentation network configured to segment the plurality of images and generate segmented images;
receiving first sensor data generated by a first sensor, the first sensor data comprising data representative of the environment;
segmenting the image data to generate segmented images;
associating the first sensor data with the segmented images to create a training dataset;
transmitting the training dataset to a machine learning network configured to run a sensor data segmentation model; and
training the sensor data segmentation model using the training dataset, such that the sensor data segmentation model is configured to segment second sensor data obtained from the first sensor.

J. The method of example I, wherein receiving the first sensor data generated by the first sensor comprises receiving sensor data generated by a light detection and ranging (LIDAR) sensor, and training the sensor data segmentation model comprises training the sensor data segmentation model using the training dataset, such that the sensor data segmentation model is configured to segment second sensor data obtained from a LIDAR sensor.

K. The method of example I or example J, further comprising projecting at least a first portion of the first sensor data onto a first segmented image of the segmented images.

L. The method of any one of example I through example K, wherein:
a first image of the plurality of images is captured at a first image time;
a second image of the plurality of images is captured at a second image time;
a first portion of the first sensor data is associated with the first sensor time;
a second portion of the first sensor data is associated with a second sensor time; and
the method further comprises:
determining a first time difference between the first image time and the first sensor time;
determining a second time difference between the second image time and the first sensor time;
determining that the first time difference is less than the second time difference; and
associating the first image with the first portion of the first sensor data based at least in part on the first time difference being less than the second time difference.

M. The method of any one of example I through example L, further comprising receiving second sensor data from the first sensor and segmenting the second sensor data based at least in part on the trained sensor data segmentation model.

N. The method of any one of example I through example M, wherein the sensor data segmentation model comprises one or more kernels, the one or more kernels associated with an asymmetric stride, and
wherein training the sensor data segmentation model comprises computing a loss function, the loss function based at least in part on an output of the sensor data segmentation model and the training dataset, the loss function comprising one or more of a cross-entropy softmax loss, a focal loss, or a logistic regression loss.

O. The method of any one of example I through example N, further comprising:
identifying discontinuities in the first sensor data; and
deleting first sensor data associated with the discontinuities.

P. The method of any one of example I through example O, further comprising:
receiving second sensor data from a sensor; and
segmenting the second sensor data received from the sensor using the sensor data segmentation model.

Q. The method of any one of example I through example P, further comprising generating a trajectory for an autonomous vehicle based at least in part on the segmented second sensor data.

R. An example computer-readable storage medium having computer-executable instructions stored thereupon which, when executed by a computer, cause the computer to:
receive a plurality of images representing an environment, the plurality of images comprising image data generated by an image capture device;
transmit the image data to an image segmentation network configured to segment the images and generate segmented images;
receive first sensor data generated by a first sensor, the first sensor data comprising data representative of the environment;
segment the images to generate segmented images;
associate the first sensor data with the segmented images to create a training dataset;
transmit the training dataset to a machine learning network configured to run a sensor data segmentation model; and
train the sensor data segmentation model using the training dataset, such that the sensor data segmentation model is configured to segment second sensor data obtained from a sensor.

S. The computer-readable storage medium of example R, wherein the first sensor data is generated by a light detection and ranging (LIDAR) sensor, and training the sensor data segmentation model comprises training the sensor data segmentation model using the training dataset, such that the sensor data segmentation model is configured to segment second sensor data obtained from a LIDAR sensor.

T. The computer-readable storage medium of example R or example S, wherein:
a first image of the plurality of images is captured at a first image time;
a second image of the plurality of images is captured at a second image time;
a first portion of the first sensor data is associated with the first sensor time;
a second portion of the first sensor data is associated with a second sensor time;
and the computer-executable instructions cause the computer to:
determine a first time difference between the first image time and the first sensor time;
determine a second time difference between the second image time and the first sensor time;
determine that the first time difference is less than the second time difference; and
associate the first image with the first portion of the first sensor data based at least in part on the first time difference being less than the second time difference.

What is claimed is:
1. A system comprising:
one or more processors; and
one or more non-transitory computer readable storage media communicatively coupled to the one or more processors and storing instructions executable by the one or more processors to perform operations comprising:
- receiving image data comprising first segmentation information;
- receiving sensor data from at least one of a light detection and ranging (LIDAR) sensor, a radio detection and ranging (RADAR) sensor, or a sound navigation and ranging (SONAR) sensor;
- associating the sensor data with the first segmentation information as part of a training dataset; and
- training a sensor data segmentation model using the training dataset to output second segmentation information in response to receiving at least one of additional lidar data, additional radar data, or additional sonar data.

2. The system of claim 1, wherein associating the sensor data with the first segmentation information comprises:
- determining, based at least in part on the first segmentation information and a portion of the sensor data, a classification associated with a type of an object; and
- associating the classification with the portion of the sensor data.

3. The system of claim 1, the operations further comprising:
- capturing a portion of the image data at a first time;
- capturing a portion of the sensor data at a second time;
- determining a time difference between the first time and the second time; and
- determining at least one of temporal alignment information or spatial alignment information associated with the portion of the sensor data and the portion of the image data based at least in part on the time difference.

4. The system of claim 1, the operations further comprising:
- receiving second image data; and
- determining a location of an object in the second image data based at least in part on the second segmentation information.

5. The system of claim 1, wherein the second segmentation information is output based on steps between kernels of the sensor data segmentation model along a length dimension that are higher than steps between the kernels of the sensor data segmentation model along a height dimension.

6. The system of claim 1, the operations further comprising:
- identifying a discontinuity associated with the sensor data; and
- disregarding a portion of the sensor data associated with the discontinuity.

7. The system of claim 1, wherein the sensor data comprises LIDAR sensor data received from the LIDAR sensor, the operations further comprising:
- segmenting, by the sensor data segmentation model, the LIDAR sensor data as third segmentation information; and
- storing the third segmentation information.

8. The system of claim 7, the operations further comprising:
- transmitting the sensor data segmentation model to an autonomous vehicle, the autonomous vehicle configured to generate a trajectory based at least in part on the sensor data segmentation model.

9. A method comprising:
- receiving image data comprising first segmentation information;
- receiving sensor data from at least one of a light detection and ranging (LIDAR) sensor, a radio detection and ranging (RADAR) sensor, or a sound navigation and ranging (SONAR) sensor;
- associating the sensor data with the first segmentation information as part of a training dataset; and
- training a sensor data segmentation model using the training dataset to output second segmentation information in response to receiving at least one of additional lidar data, additional radar data, or additional sonar data.

10. The method of claim 9, wherein associating the sensor data with the first segmentation information comprises:
- determining, based at least in part on the first segmentation information and a portion of the sensor data, a classification associated with a type of an object; and
- associating the classification with the portion of the sensor data.

11. The method of claim 9, further comprising:
- capturing a portion of the image data at a first time;
- capturing a portion of the sensor data at a second time;
- determining a time difference between the first time and the second time; and
- determining at least one of temporal alignment information or spatial alignment information associated with the portion of the sensor data and the portion of the image data based at least in part on the time difference.

12. The method of claim 9, further comprising:
- receiving second image data; and
- determining a location of an object in the second image data based at least in part on the second segmentation information.

13. The method of claim 9, wherein the second segmentation information is output based on steps between kernels of the sensor data segmentation model along a length dimension that are higher than steps between the kernels of the sensor data segmentation model along a height dimension.

14. The method of claim 9, further comprising:
- identifying a discontinuity associated with the sensor data; and
- disregarding a portion of the sensor data associated with the discontinuity.

15. The method of claim 9, wherein the sensor data comprises LIDAR sensor data received from the LIDAR sensor, the method further comprising:
- determining, by the sensor data segmentation model and based at least in part on the LIDAR sensor data, third segmentation information; and
- storing the third segmentation information.

16. The method of claim 15, further comprising generating a trajectory for an autonomous vehicle based at least in part on the third segmentation information.

17. The method of claim 9, further comprising:
- receiving additional sensor data comprising the at least one of the additional lidar data, the additional radar data, or the additional sonar data, the additional sensor data being described in cylindrical or spherical coordinates;
- associating the additional sensor data with planar coordinates;
- segmenting, by the sensor data segmentation model, the additional sensor data as the segmented sensor data; and
- outputting, by sensor data segmentation model, the segmented sensor data.

18. One or more non-transitory computer-readable storage media having computer-executable instructions stored thereupon which, when executed by one or more processors, cause the one or more processors to perform operations comprising:
- receiving image data comprising first segmentation information;
- receiving sensor data from at least one of a light detection and ranging (LIDAR) sensor, a radio detection and ranging (RADAR) sensor, or a sound navigation and ranging (SONAR) sensor;
- associating the sensor data with the first segmentation information as part of a training dataset; and
- training a sensor data segmentation model using the training dataset to output second segmentation information in response to receiving at least one of additional lidar data, additional radar data, or additional sonar data.

19. The one or more non-transitory computer-readable storage media of claim 18, wherein the sensor data comprises LIDAR sensor data received from the LIDAR sensor, the operations further comprising:
- determining, by the sensor data segmentation model and based at least in part on the LIDAR sensor data, third segmentation information; and
- storing the third segmentation information.

20. The one or more non-transitory computer-readable storage media of claim 18, the operations further comprising:
- capturing a portion of the image data at a first time;
- capturing a portion of the sensor data at a second time;
- determining a time difference between the first time and the second time; and
- determining at least one of temporal alignment information or spatial alignment information associated with the portion of the sensor data and the portion of the image data based at least in part on the time difference.

* * * * *